United States Patent [19]
Cooper et al.

[11] Patent Number: 6,023,617
[45] Date of Patent: Feb. 8, 2000

[54] CALL ROUTING IN A WIRELESS TELECOMMUNICATIONS SYSTEM

[75] Inventors: Guy A. Cooper, Windsor; Gavin J. Meakes, Canvey Island; Richard M. Lamkin, East Molesey, all of United Kingdom

[73] Assignee: Alcatel USA Sourcing, L.P., Plano, Tex.

[21] Appl. No.: 08/947,233

[22] Filed: Oct. 8, 1997

[30] Foreign Application Priority Data

Oct. 9, 1996 [GB] United Kingdom .................... 9621070
Dec. 20, 1996 [GB] United Kingdom .................... 9626595

[51] Int. Cl.$^7$ ................................................. H04M 11/00
[52] U.S. Cl. ........................................... 455/403; 455/554
[58] Field of Search .................................. 455/554, 555, 455/406, 407, 408, 403

[56] References Cited

U.S. PATENT DOCUMENTS

| | | |
|---|---|---|
| 3,894,194 | 7/1975 | Frost . |
| 4,233,473 | 11/1980 | Frost . |
| 4,775,997 | 10/1988 | West, Jr. et al. ........................ 455/554 |
| 4,890,315 | 12/1989 | Bendixen et al. ....................... 455/554 |
| 5,027,388 | 6/1991 | Bradshaw et al. ...................... 379/112 |
| 5,291,543 | 3/1994 | Freese et al. ............................. 379/59 |
| 5,325,418 | 6/1994 | McGregor et al. ........................ 379/59 |
| 5,339,352 | 8/1994 | Armstrong et al. ...................... 379/58 |
| 5,544,223 | 8/1996 | Robbins et al. .......................... 379/58 |
| 5,594,777 | 1/1997 | Makkonen ............................... 455/406 |
| 5,751,789 | 5/1998 | Farris et al. ............................. 455/554 |
| 5,787,355 | 7/1998 | Bannister et al. ....................... 455/554 |

FOREIGN PATENT DOCUMENTS

| | | |
|---|---|---|
| 0420623 | 4/1991 | European Pat. Off. ....... H04Q 11/04 |
| 0433465 | 6/1991 | European Pat. Off. ......... H04M 3/42 |
| 0647055 | 4/1995 | European Pat. Off. ....... H04M 15/28 |
| 0656733 | 6/1995 | European Pat. Off. ......... H04Q 7/22 |
| 2174571 | 11/1986 | United Kingdom ............. H04Q 7/04 |
| 9522230 | 8/1995 | WIPO . |
| 9601543 | 1/1996 | WIPO .............................. H04Q 7/20 |

*Primary Examiner*—Paul Loomis
*Attorney, Agent, or Firm*—Baker & Botts, L.L.P.

[57] ABSTRACT

The present invention provides a central terminal (10), and method of operation of such a central terminal (10), for routing calls between a telephone exchange (18) connectable to the central terminal (10) and a plurality of subscriber terminals (20), the central terminal (10) being arranged to communicate with the subscriber terminals (20) via wireless links (515), and each subscriber terminal (20) being arranged to support one or more lines (525) to subscriber telecommunications equipment. According to the invention, the central terminal (10) comprises a storage unit arranged to store a phone number list (535) associating phone numbers for said subscriber telecommunications equipment with corresponding of said lines (525) to subscriber telecommunications equipment.

14 Claims, 12 Drawing Sheets

CALL ROUTING IN A WIRELESS TELECOMMUNICATIONS SYSTEM

TECHNICAL FIELD OF THE INVENTION

The present invention relates in general to telecommunications systems, and in particular to call routing in a wireless telecommunications system.

BACKGROUND OF THE INVENTION

A wireless telecommunications system has been proposed with a central terminal, or station, arranged to communicate via wireless links with a plurality of subscriber terminals, or stations, at subscriber locations to implement a wireless telephony system. The system is intended to be used with fixed subscriber locations rather than the more familiar mobile cellular telephone systems.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

The central terminal is connected to a telephone network and exists to relay messages from subscribers in the cell controlled by the central station to the telephone network, and vice versa. In a typical arrangement, a central terminal may have a plurality of modems for supporting a plurality of subscriber links to subscriber terminals. Each subscriber terminal may be able to support more than one line, and so the number of lines supported may be greater than the number of links.

Typically, a plurality of modems at the central terminal may share one connection to the exchange through which all calls to and from subscriber terminals supported by those modems pass. These calls are sent over this single connection in blocks called frames, a frame consisting of a number of timeslots. The exchange will place a call for a particular subscriber terminal on a particular timeslot, so that call information destined for a particular subscriber terminal can be extracted by the central terminal and passed to the appropriate modem for sending over a wireless link to that subscriber terminal. Hence, the central terminal performs fixed timeslot mapping to map calls from particular timeslots in the exchange—central terminal connection to particular wireless links to subscriber terminals, and vice versa, thereby routing calls between the subscriber terminals and the exchange.

Thus, it will be apparent that the central terminal currently has little flexibility in the way it manages calls.

SUMMARY OF THE INVENTION

Viewed from a first aspect, the present invention provides a central terminal for routing calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the central terminal comprising: a storage arranged to store a phone number list associating phone numbers for said subscriber telecommunications equipment with corresponding of said lines to subscriber telecommunications equipment.

The present invention provides the central terminal with far more flexibility in the way it manages calls, since the central terminal is no longer restricted to performing fixed mapping. By providing a phone number list within the central terminal, associating phone numbers for said subscriber telecommunications equipment with particular lines, the central terminal is provided with more knowledge about the subscriber terminals and telecommunications equipment that it supports. The central terminal can use this phone number list to handle calls without utilising fixed timeslot mapping. Hence, assuming the exchange has the ability to include within a call directed to the central terminal information identifying the phone number to which the call is directed, the central terminal will be able to use the phone number list to determine which line should be use for transmitting the call. Thus, irrespective of which time slot the call arrives at the central terminal on, the central terminal can correctly route the call.

The present invention will be particularly advantageous when wireless telecommunications systems are used to handle more advanced telephony features such as ISDN (Integrated Services Digital Network), since then the flexibility provided by the present invention is particularly beneficial. For example, ISDN calls may include phone number information which a system in accordance with the present invention will be able to use to manage the call without needing to perform any fixed timeslot mapping.

ISDN services are being made available in wired telephony systems, and typically ir such wired systems, the multiplexors positioned between the exchange and subscribers maintain a fixed timeslot mapping, with the ISDN protocols being used on the single connection between the exchange and the multiplexor. The present invention takes a different approach, since rather than leaving the central terminal merely to perform fixed timeslot mapping, the central terminal is instead provided with a phone number list to enable it to be far more flexible in its management of calls, so as to allow the central terminal to make use of phone number information which may accompany more advanced telephony communications such as those using ISDN.

In preferred embodiments, the central terminal further comprises: a call manager for receiving a call from a subscriber terminal connected to the central terminal; comparison logic for comparing a destination phone number contained within the call with the phone numbers maintained in the phone number list; and routing means, responsive to a match by the comparison logic, to route the call directly to the subscriber terminal to which the telecommunications equipment corresponding to the destination phone number is connected.

Hence, if a call is received at the central terminal from a subscriber terminal which includes information identifying the phone number to which the call is directed, then this phone number information can be compared with the phone numbers in the phone number list held within the central terminal. If the phone number matches one of the numbers in the phone number list, then this indicates that the telecommunications equipment to which the call is directed is connected to another of the subscriber terminals supported by the central terminal. In this instance, the call can be routed directly by the central terminal without passing the call via the telephone exchange. This may be useful in a number of situations, for example for exhibition sites, etc where short term local phone facilities may be required. By providing a central terminal and a number of subscriber terminals, a telephone network can be established without wired cables needing to be laid, and the central terminal can then route the calls based on phone number information provided within the calls. A point to multiple point radio link would thereby be provided without the necessity for a connection to the exchange.

In preferred embodiments, the central terminal further comprises: a call manager for receiving a call from the telephone exchange or from subscriber terminals, and for generating a call instance to represent said call, the call instance having a plurality of attribute fields to store attributes defining the call, one such attribute being a phone number provided by the call; the phone list being accessible by the call instance to enable other attributes of the call to be determined from said phone number provided by the call.

By this approach a call instance representing a call can use the phone number list to establish a suitable line to be used to route the call to subscriber telecommunications equipment.

Preferably, the central terminal further comprises a call list record accessible by the call manager, for containing a pointer to each call instance created by the call manager.

The phone number list may be arranged such that a single phone number may be associated with one or more of said lines. Further, one of said lines may be associated with one or more phone numbers. This feature will be useful for bureaus and switchboards, bus may also be used in situations where a number of people share a house, since in that instance each person can have his/her own phone number without needing to have separate lines.

In preferred embodiments, the storage of the central terminal is further arranged to store a line list data element arranged to include a list of pointers to particular line data elements, each line data element identifying a line to subscriber telecommunications equipment. Each line data element can include supplementary service details specific to the line, such as whether incoming calls or outgoing calls are barred, whether 'Advice of Charge' (AOC) service has been selected, etc. This means that such services can now be specified on a per subscriber basis. Previously, this was not possible and instead such services would be specified for particular stacks of subscribers at the exchange.

In preferred embodiments, the phone number list includes, for each phone number in the list, a pointer to the line list data element that includes pointers to said line data elements that identify suitable lines to be used to direct a call to the subscriber telecommunications equipment having that phone number.

In preferred embodiments, the phone number list is represented by an object oriented programming (OOP) object. However, it will be apparent to those skilled in the art that the use of an OOP object is not essential, and any other appropriate way to represent the phone number list may be used.

Viewed from a second aspect, the present invention provides a call routing element for a central terminal to arrange the central terminal to route calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the call routing element comprising: a phone number list associating phone numbers for said subscriber telecommunications equipment with corresponding of said lines to subscriber telecommunications equipment.

Viewed from a third aspect, the present invention provides a method of operating a central terminal to route calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the method comprising the step of: storing a phone number list associating phone numbers for said subscriber telecommunications equipment with corresponding of said lines to subscriber telecommunications equipment.

Viewed from a fourth aspect, the present invention provides a computer program product: on a computer readable memory for operating a central terminal to route calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the computer program product comprising: a storage arranged to store a phone number list associating phone numbers for said subscriber telecommunications equipment with corresponding of said lines to subscriber telecommunications equipment.

The present invention provides the central terminal with far more flexibility in the way it manages calls, since the central terminal is no longer restricted to performing fixed mapping. By providing a phone number list within the central terminal, associating phone numbers for said subscriber telecommunications equipment with particular lines, the central terminal is provided with more knowledge about the subscriber terminals and telecommunications equipment that it supports. The central terminal can use this phone number list to handle calls without utilising fixed timeslot mapping. Hence, assuming the exchange has the ability to include within a call directed to the central terminal information identifying the phone number to which the call is directed, the central terminal will be able to use the phone number list to determine which line should be use for transmitting the call.

BRIEF DESCRIPTION OF THE DRAWING;,

An embodiment of the invention will be described hereinafter, by way of example only, with reference to the accompanying drawings in which like reference signs are used for like features and in which.

DETAILED DESCRIPTION OF THE INVENTION

Figure 1:
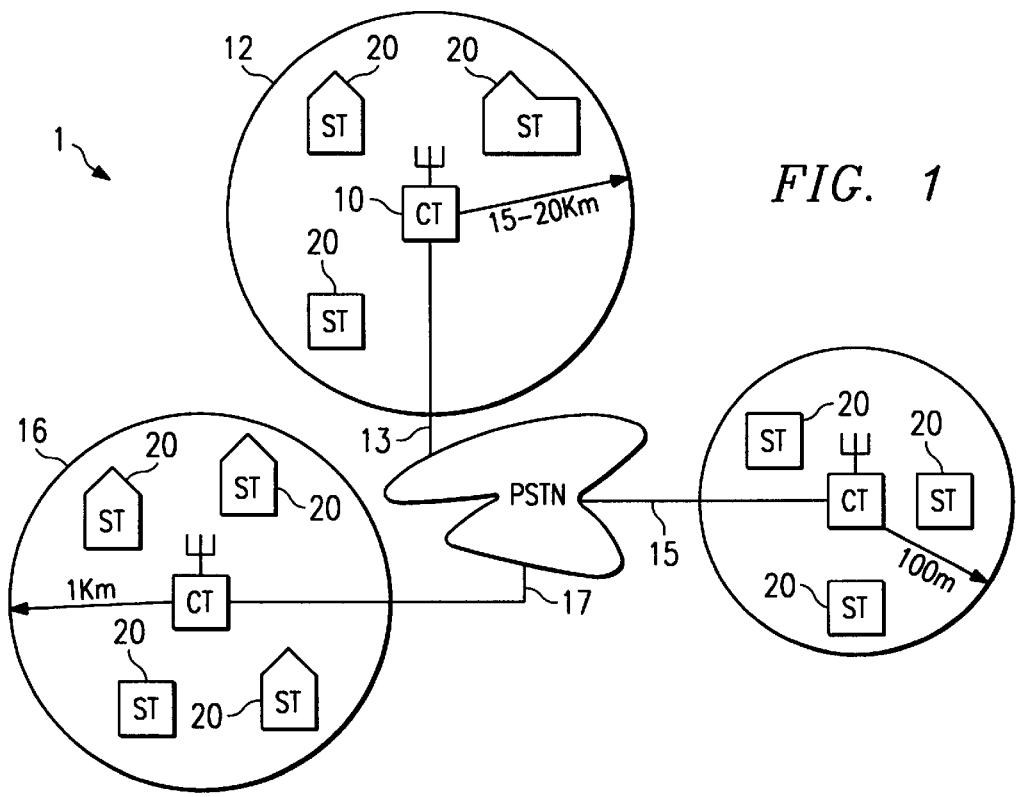
FIG. 1 is a schematic overview of an example of a wireless telecommunications system in which an example of the present invention is included.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

Figure 2:
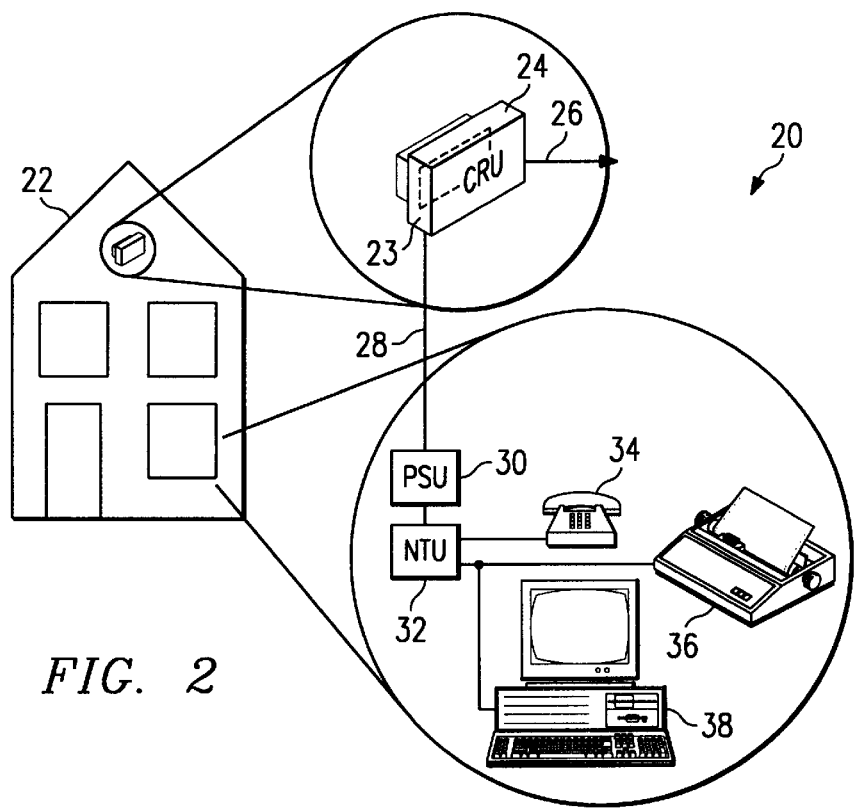
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a (single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
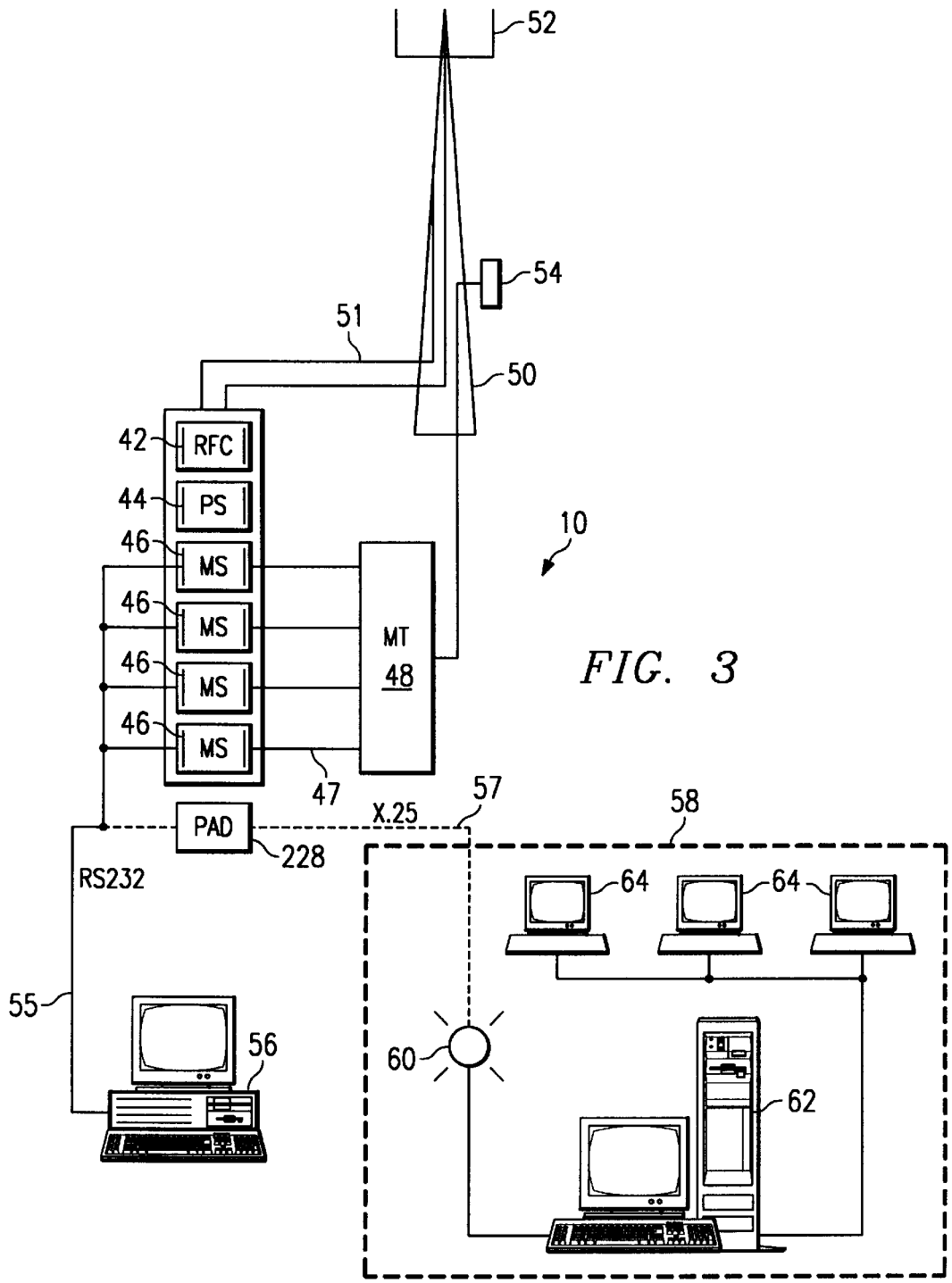
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (EC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
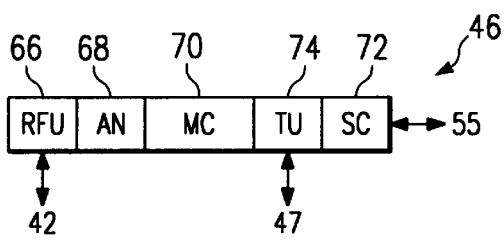
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and x 16 spreading with Code Division Multiplexed Access (CDMA) codes on the transmit signals, and synchronisation recovery, de-spreading and error correction on the receive signals. Each modem card 70 in the present example has taco modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
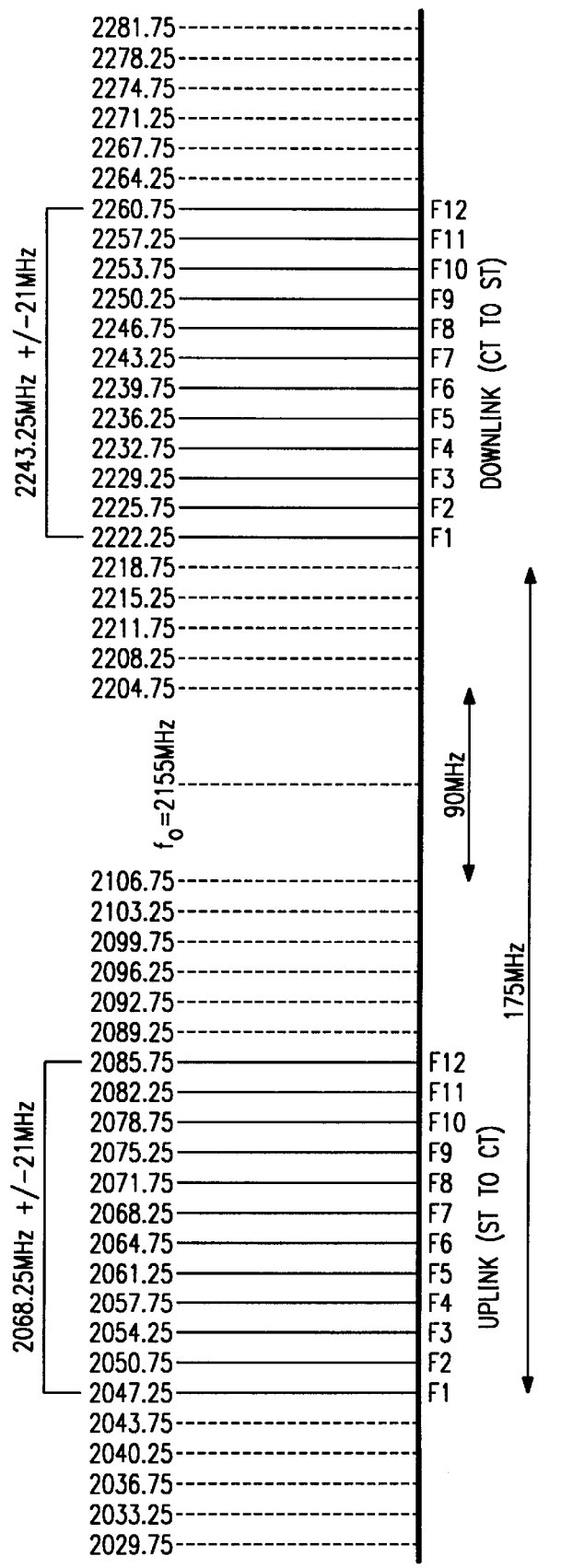
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

Figure 5A:
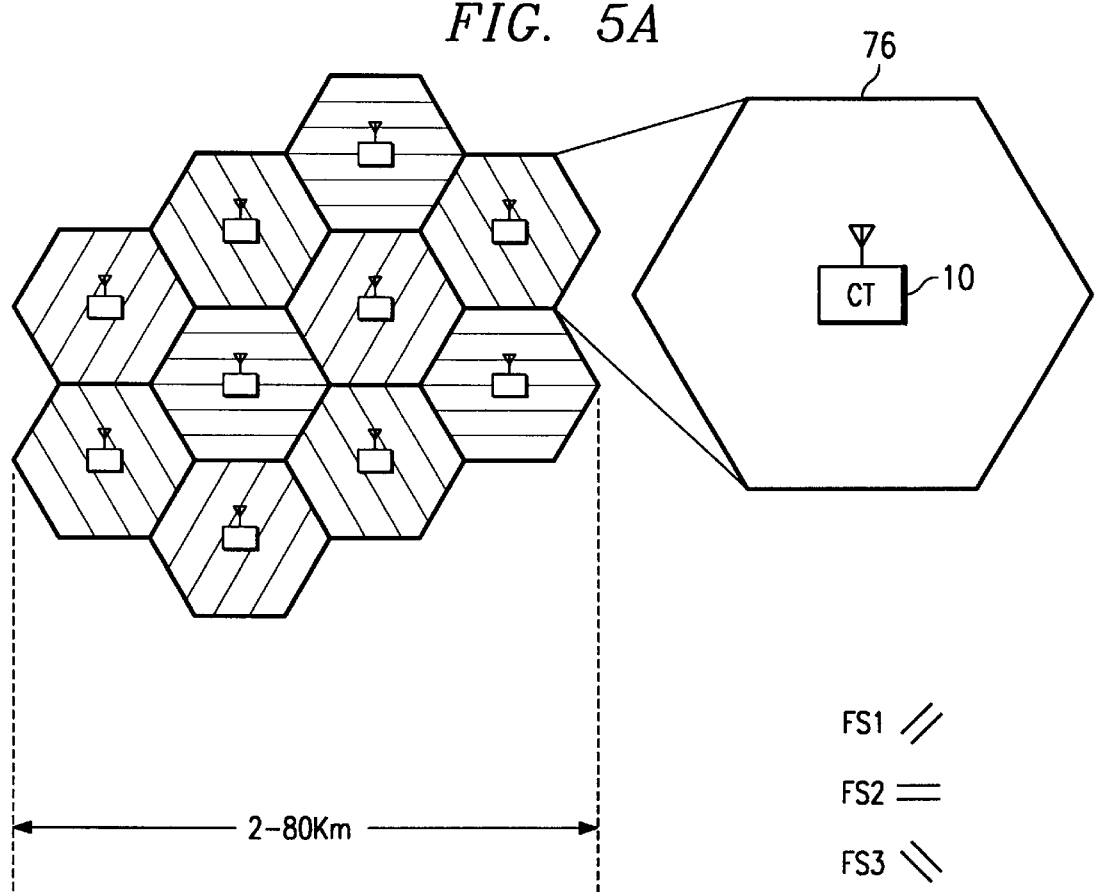
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
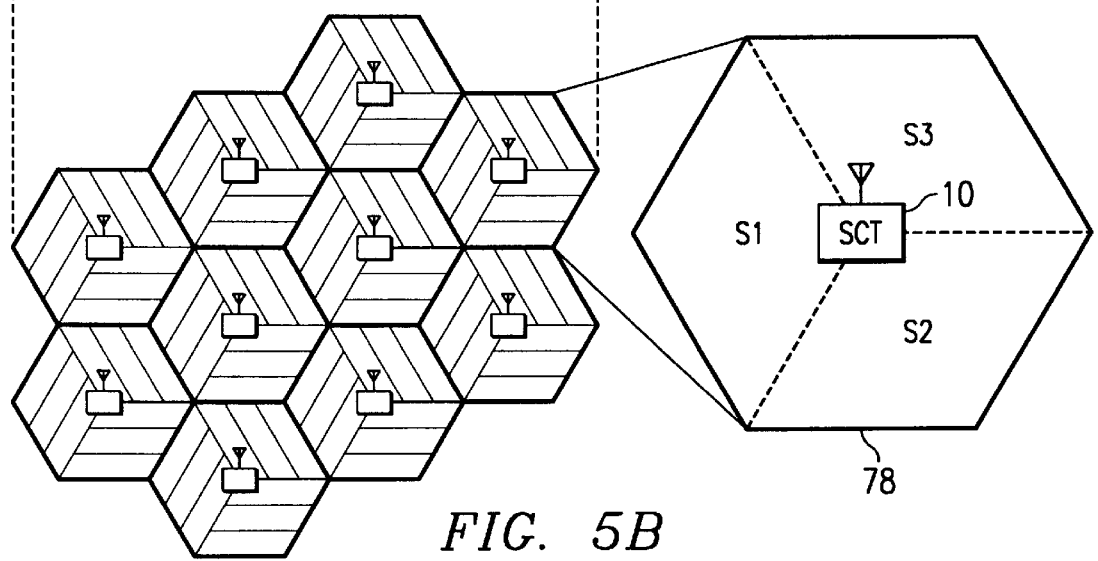

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines:, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, FS, F8, F11; FS3=F3, F6, F9, F12) . However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

As mentioned above, each channel frequency can support 15 subscriber links. In this example, this is achieved using by multiplexing signals using a Code Division Multiplexed Access (CDMA) technique. More details on CDMA encoding/decoding, and on the signal processing stages employed in the subscriber terminals and central terminal to manage communications between them, can be found in UK Patent application no. 9511546.5, filed Jun. 7, 1995.

Figure 6:
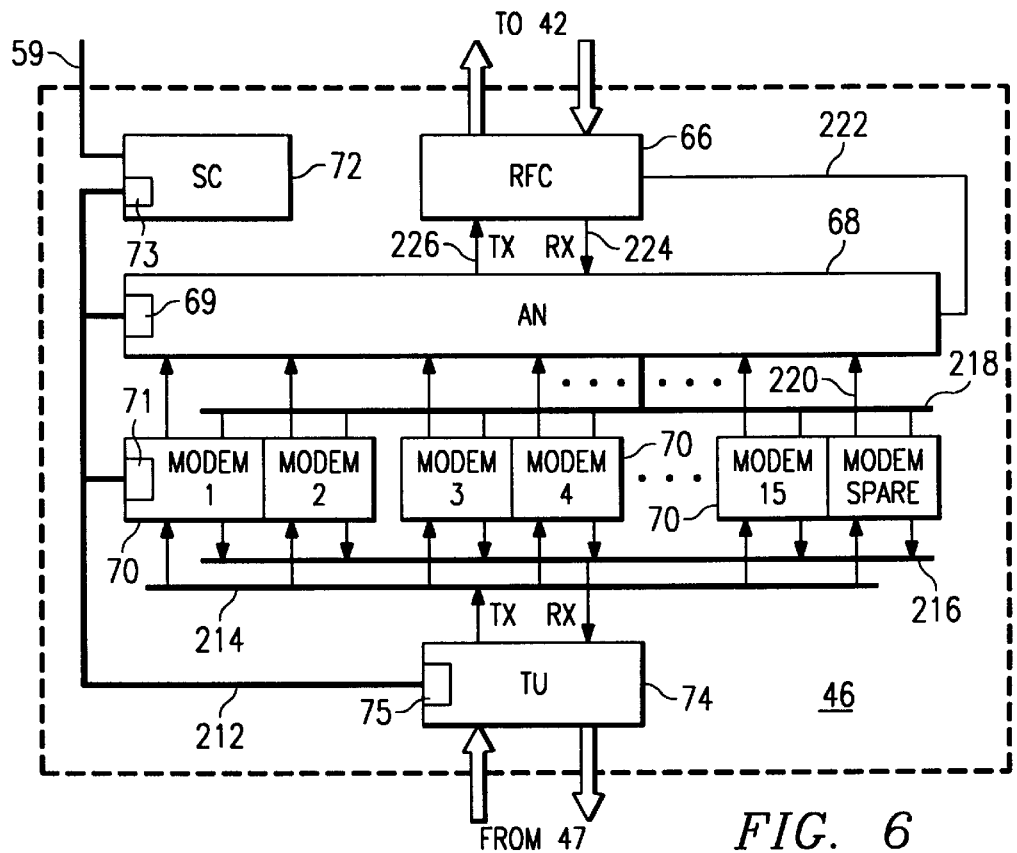
FIG. 6 is a schematic diagram illustrating in more detail the configuration of the modem shelf of FIG. 3A.

FIG. 6 is a schematic diagram illustrating in more detail the configuration of one of the modem shelves 46. The shelf controller 72 manages the operation of the whole of the modem shelf and its daughter network sub-elements (NSEs). The shelf controller (SC) 72 is provided with a RS232 serial port 59 for connection to the server 56 or to the pad 228. The shelf controller communicates control and data information via a backplane asynchronous bus 212 directly with the analogue card (AN) 68, the tributary unit card (TU) 74 and the modem cards (MC) 70. Other network sub-elements are connected via the modem cards. In a fully populated rack there will be four shelf controllers, one on each modem shelf. These four shelf controllers are configured to share the control of network service elements on other cards in the rack. The network service elements on the RF combiner shelf 42 are connected to the shelf controller backplane bus on each of the modem shelves. The shelf controller includes a master communications interface 73 for performing the communications functions mentioned above and other control functions. Each of the tributary card 74, the analogue card 68 and each modem card 70 includes a respective slave communications interface 75, 69 and 71, which manages the communications with the shelf controller 72. The RF card 66 is controlled from the analogue card 68, which is configured to provide the necessary control functions via the control path 222.

Also shown in FIG. 6 are the signal paths from an interface to the public switched telephone network (e.g via lines 47 in FIG. 3) and the interface to an RF combiner shelf 42.

The tributary unit 74 terminates the connection to the host public switched telephone network and handles the processing of telephony information for up to 15 subscriber terminals (up to 30 calls). The tributary unit 74 is 'on-line'in that it directly processes calls. The tributary unit 74 is also connected to a 2 Mb/s time-multiplexed (timeslot) transmit bus 214 and 2 Mb/s time-multiplexed (timeslot) receive bus 216 for transmit and receive calls, respectively.

The modems (1–15) on the modem cards 70 perform baseband signal processing of the transmit and receive signals including the convolution coding and spreading functions on the transmit signals, and the synchronisation recovery, de-spreading and error correction functions on the receive signals, as described earlier. Each modem is connected to the tributary unit 7 zL via the transmit and receive buses 214 and 216, and to the analogue card 68 via a dedicated connection 220 to one of a number of ports on the analogue card and via a digital CDMA RCV bus 218. Each of these dedicated connections includes multiplexed I, Q and control transmit paths The analogue card 68 perform,, A-D/D-A conversions, baseband filtering and vector summation of the 15 transmit signals from the modem cards. The analogue card 68 also scales the transmit signal power level according to high or low power levels. It is connected to the modem cards via the dedicated connections 220 and the digital CDMA RCV bus 218.

The RF card 66 generates the modulated transmit RF signals (at medium power level) and recovers and amplifies the baseband RF signal from the subscriber terminals 20. The RF card is 'on-line' in that it passes up to 30 calls simultaneously via the 15 available links, all on the same RF carrier. The RF card is connected to the analogue card via transmit and receive paths 226 and 224, respectively. The RF card is also connected to power amplifiers of the RF combiner shelf on the transmit side and to a low noise amplifier on the receive side. The power amplifiers (not shown) in the RF combiner shelf amplify the medium power output of the RF card 66 to an appropriate transmit power plus an amount to cover losses daring signal combination and in the antenna feeder cable for the transmit signal. The low noise amplifier (not shown) is a low signal amplifier for overcoming losses in the antenna feeder etc. for the receive signal. The transmit carrier modulation is performed by the RF card 66 using an 'IQ modulator' at intermediate frequency and a singles conversion to RF. The receive output of the RF card is at baseband in 'IQ' format as per the transmit input to the RF card.

Figure 7:
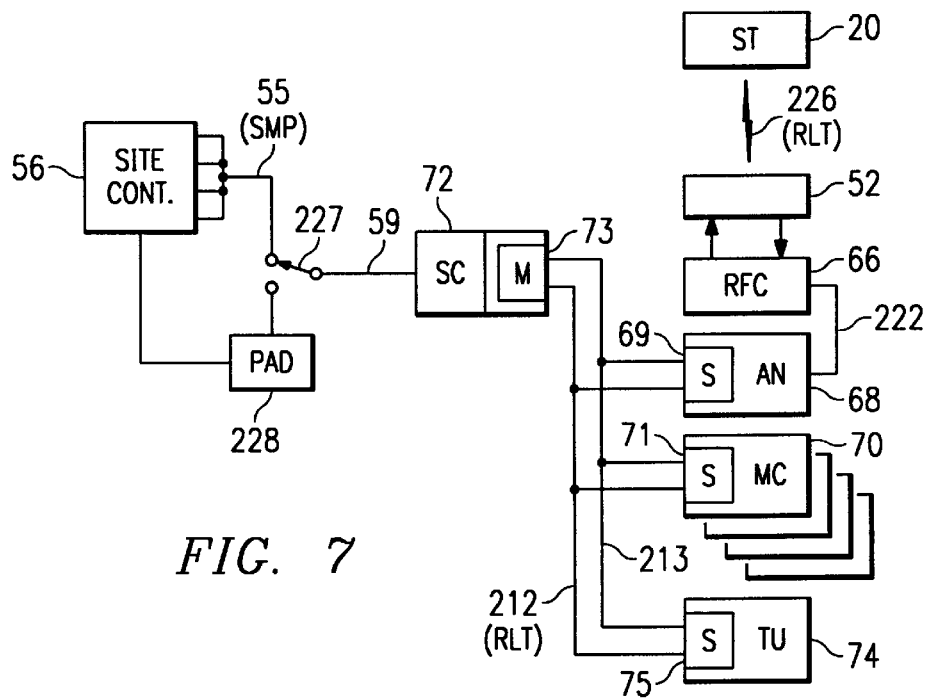
FIG. 7 is a schematic block diagram illustrating control protocols for the telecommunication system of FIG. 1.

FIG. 7 is a schematic block diagram illustrating an example of various control protocols used for the transmission of control information between different parts of an example of a telecommunications system in accordance with the invention. It should be noted that FIG. 7 is directed to the control signal paths, and accordingly, the telephone call signal paths are not included. Many of the features of FIG. 7 have already been described above, and in this case the same reference numerals are used as before. Accordingly, these features will not be described again in detail.

A first protocol, called the Sub-system Management Processor (SMP) protocol, is used for communications between the shelf controller 72 and a server 56, or element manager 58, via lines 59 and 55, or 51 and 57, respectively. The first protocol is a balanced protocol with either party to a communication being able to initiate an exchange of information. As mentioned above, the shelf controller 72 is provided with an RS232 serial output for connection to a server 56 or to a pad 228.

A second protocol, called the Radio Link Termination (RLT) protocol, is used for passing control and data information via the control 212 and data 213 buses on the modem shelf. In addition, it should be noted that the same protocol is valid on the radio link 226 between the antenna 52 of the central terminal and the subscriber terminal(s) 20.

The second protocol is an unbalanced protocol with the microprocessor 73 in the shelf controller 72 acting as a busmaster (M) and the microcontrollers 69, 71 and 75 on the analogue card 68, the modem cards 70 and the tributary unit 74 acting as slaves. More details of the first (SMP) and second (RLT) protocols can be found in UK patent application 9510870.0, filed Jun. 2, 1995, to which the reader is referred for further details.

In preferred embodiments of the present invention, the software within the central terminal used to manage calls is implemented using an object oriented programming (OOP) approach. In the arrangement discussed earlier with reference to FIGS. 3, 3A and 6, this software would typically be located within the TU, but it will be apparent to those skilled in the art that the exact location of the software within the central terminal will depend upon how the central terminal is arranged.

Figure 8:
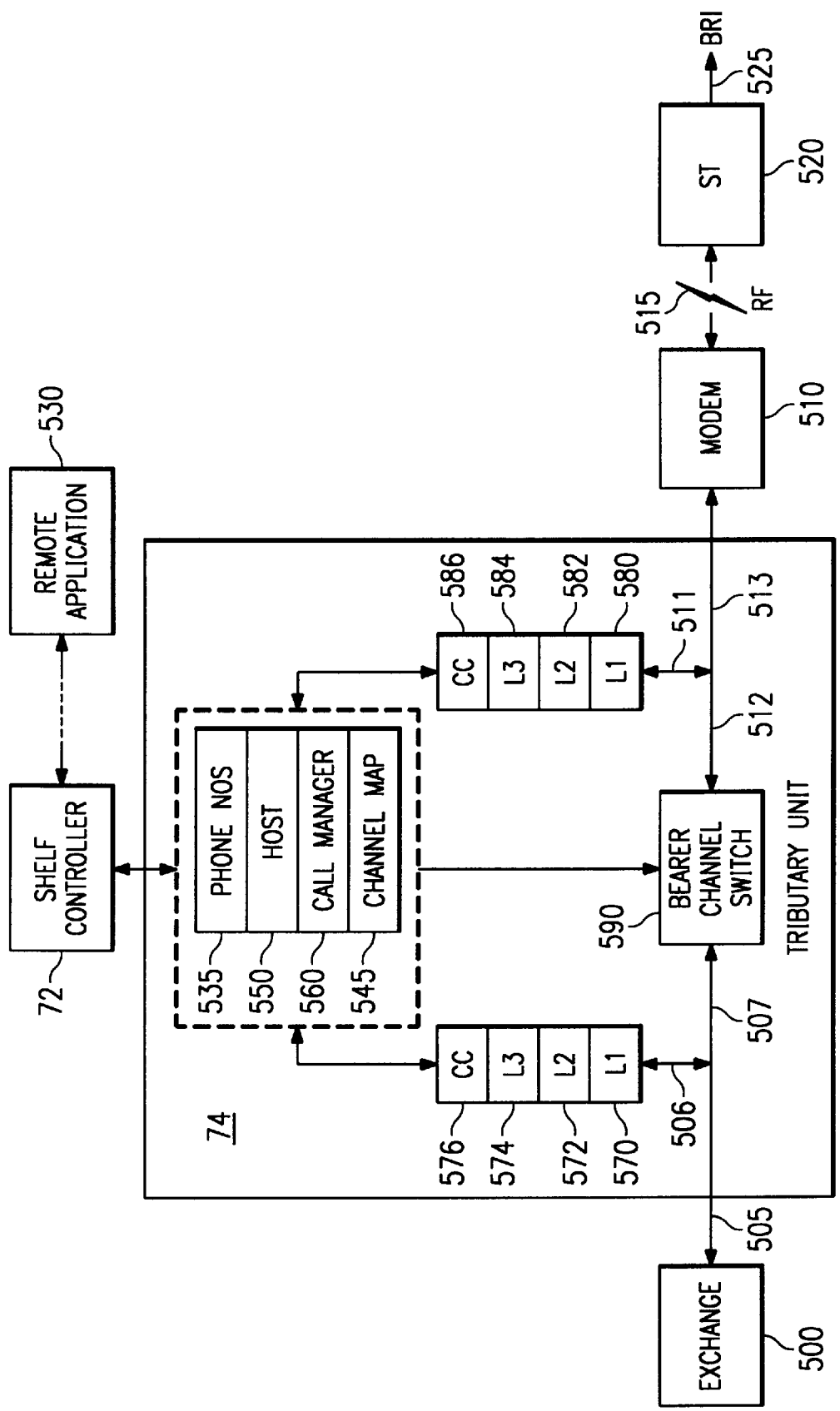
FIG. 8 is a block diagram illustrating some of the elements of the central terminal used to manage calls between subscriber terminals and the exchange.

FIG. 8 is a block diagram illustrating some of the elements of the central terminal used to manage calls between subscriber terminals and the telephone exchange. In preferred embodiments of the present invention, the function of the software elements within the tributary unit 74 is to provide an interface between a single 2 Mbits/s primary rate interface (PRI) ISDN connection 505 and 15 sets of basic rate interface (BRI) ISDN (2B+D, 144 Kbits/s) connections 525 to subscriber telecommunications equipment. The software is responsible for connecting PRI and BRI B-channels on call setup, and must also multiplex data between the 15

BRI D-channels and the single PRI D-channel throughout the duration of a call.

The shelf controller 72 can communicate with the tributary unit 74 in order to download a phone list 535 and/or a channel map 545 to the tributary unit 74. The phone list 535 and channel map 545 can be updated from a site controller 56. A remote application 530 running on the site controller 56 can be used to pass the necessary information to the shelf controller 72 for subsequently downloading to the tributary unit 74.

Within the tributary unit 74, signalling stacks 570, 572, 574, 576 and 580, 582, 584, 586 are provided to pass call control messages to the host application 550. In addition to the call control messages, the signalling stacks may also pass to the host application 550 supplementary service messages, relating to facilities such as "Advice of Charge" (AOC), call barring, call forwarding, call redirection, etc. In preferred embodiments, there will be 15 signalling stacks 580, 582, 584, 586 corresponding to the 15 BRI connections. However, for the purpose of clarity, only one such stack is shown in FIG. 8. All of the signalling stacks provide identical function, and the various layers within these stacks will now be discussed in more detail.

The layer one task 570 is responsible for the activation and deactivation of the physical link between the exchange and the bearer channel switch 590 within the tributary unit 74, or in the case of the layer one task 580, between the subscriber terminal's telecommunications equipment and the layer one task 580 via the modem 510, the RF link 515 and the subscriber terminal 520. The layer one task 570, 580 communicates with the layer two tasks 572, 582 to activate and deactivate the physical link at the request of the layer two task, and to notify the layer two task when the physical link is deactivated.

The layer two task 572, 582 implements a suitable protocol to provide error free, in-sequence transmission and reception of messages through a "High level Data Link Control" (HDLC) controller connected to the D-channel. HDLC is an industry standard interface and hence need not be discussed further herein. In preferred embodiments, a suitable protocol is the LAPD protocol defined in CCITT recommendation Q.921. The primary function of the layer two task 572, 582 is to provide the layer three task 574, 584 with a method of sending and receiving messages via the D-channel. In addition, as mentioned above, the layer two task 572, 582 can request that the layer one task 570, 580 physically activates or deactivates the link, and can also receive notifications from the layer one task when the physical link is deactivated.

The layer three task 574, 584 communicates with the layer two task 572, 582 to send and receive messages via the D-channel. It also communicates with the call control layer 576, 586 using basic call control messages and supplementary service messages. In preferred embodiments, the basic call control messages are those defined by CCITT recommendation Q.931 (User-Network specification for basic call control), the layer three task 574, 584 implementing the Protocol Control portion of Q.931.

The call control layer 576, 586 communicates with the host application 550 to pass call control messages (indications and confirmations of call control events) to the host application. The call control layer 576, 586 receives requests for call control actions and responses to call control indications from the host application 550. In preferred embodiments the call control layer 576, 586 can be considered to be the application specific implementation of Q.931, the call control layer being application specific in that it must have knowledge of available B-channels and their capabilities. The call control layer 576, 586 also communicates with the layer three task 574, 584, preferably using messages based on Q.931 primitives.

Having discussed the signalling stacks, the function of the host application 550 will now be discussed in more detail. The PRI and BRI call control tasks 576, 586 communicate with the host application 550, which in turn communicates with the bearer channel switch hardware 590 and the shelf controller 72. One of the tasks of the host application 550 will be to initialise and configure the system as directed by the shelf controller 72. In preferred embodiments, the host application 550 will configure the system under the direction of the shelf controller as follows:

1. The shelf controller 72 will send a "Signalling Configuration" message which specifies the type of signalling (PSTN, ISDN, etc) required. In preferred embodiments, ISDN signalling will be requested, and a "Signalling Response" will be returned to the shelf controller 72 indicating acceptance of the configuration. A number of signalling types may be provided to encompass different switch configurations.
2. A number of configuration messages will be sent by the shelf controller to configure the system.
3. A "Signalling Activation" message will be sent by the shelf controller 72 to place the tributary unit 74 into service and enable signalling procedures on all configured lines.

At start up, all Digital Subscriber Loops (DSLs) and B-channels will default to deactivated and signalling will default to inactive. A Digital Subscriber Loop represents a resource between the central terminal and either the exchange or the subscriber terminals. Hence, in the arrangement of the preferred embodiment, there will be one DSL to represent the PRI connection between the exchange and the central terminal, and 15; DSLs to represent the 15 BRI connections between the central terminal and the subscriber telecommunications equipment supported by the 15 subscriber terminals. Thus no calls may be made through the system until the above initialization procedure has been completed. It should be noted that it is not necessary for all fifteen BRIs to be configured, and any number of DSLs or B-channels may be left inactive.

Another task of the host application 550 is to interface to the PRI and BRI call control tasks. Messages are passed to and received from the call control tasks, and such messages will be translated by the host application 550 into a form acceptable to the peer call control task.

Further, on call set up and clear down, the host application must connect and disconnect PRI and BRI B-channels. This is carried out at the request of the host application by the digital bearer channel switch 590, under the control of an associated Digit-al Switch Driver (DSD) (not shown in FIG. 8).

Having discussed the signalling stacks and the host application 550 provided within the tributary unit 74, an overview of how calls are passed between the exchange 500 and the subscriber terminal 520, and vice versa, will now be provided with reference to FIG. 8. When call information is passed from the exchange 500 to the tributary unit 74 over PRI 505, the signalling data is passed over line 506 to the signalling stack 570, 572, 574, 576. Here the signalling data is converted into a call control message to be passed from the call control task 576 to the host application 550.

Each time a new call is received at the tributary unit 74 from the exchange 500, a call manager 560 will be used to establish a call object (to be discussed in more detail later) which will contain attributes identifying how the call should be routed. As will be discussed in more detail later with reference to FIGS. 9 to 12, a matrix of interrelated data elements (in preferred embodiments these data elements being OOP objects), accessible by the call object, are provided to enable the call object to associate a number of other attributes with at least one attribute provided by the exchange as part of the call information.

Each time a message is received by the host from the signalling stack relating to a particular call, the host application 550 can pass D-channel information via a call control message to the appropriate BRI signalling stack 580, 582, 584, 586, and will also communicate with the bearer channel switch 590 to ensure that the bearer data is switched to the appropriate BRI B-channel. The D-channel information will be passed from the signalling stack over path 511 and backplane 513 to the corresponding modem 510, and from there on to the subscriber telecommunications equipment via the RF link 515 and subscriber terminal 520.

In addition, the bearer data will be passed through the bearer channel switch 590 onto the appropriate BRI B-channel and over paths 512 and backplane 513 to the modem 510. From there, the bearer data will be passed on to the subscriber telecommunications equipment via the RF link 515 and subscriber terminal 520. The backplane 513 will typically have a number of modems connected to it (in the preferred embodiment there will be 15 modems) and the bearer channel switch will be used to switch bearer data on to a particular backplane timeslot: (the backplane timeslot being distinct from the timeslots used on the PRI connection between the exchange and the central terminal). Each modem will receive bearer data off of a particular backplane time slot.

It will be apparent to those skilled in the art that this flow of call information can pass in either direction, and hence a subscriber terminal 523 can pass a call to the exchange 500 via the appropriate signalling stacks and the host application 550.

Figure 9:
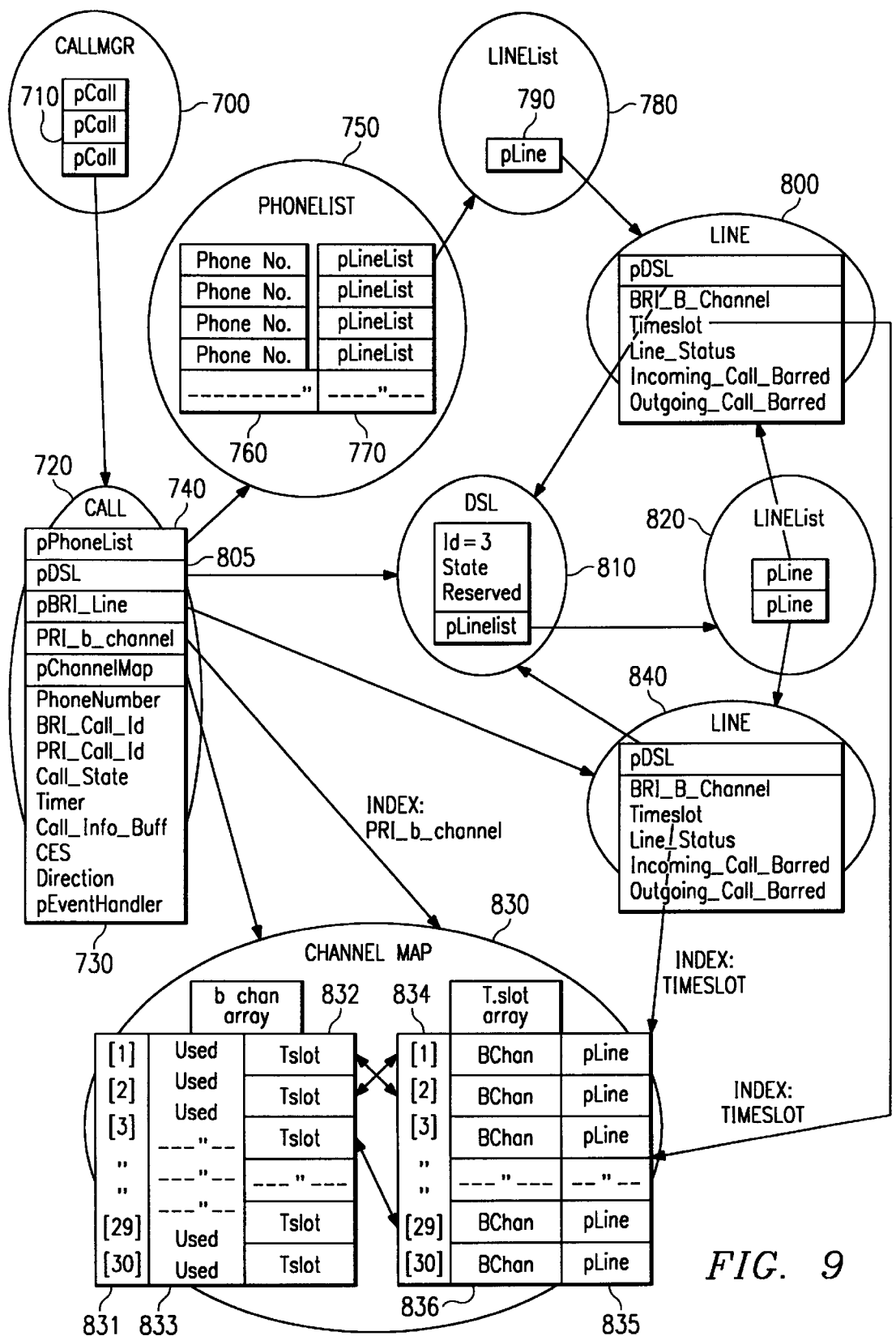
FIG. 9 is a diagram illustrating how the various software elements within the central terminal that are used to manage calls interact with one another.

Having discussed the general architecture of the system in accordance with the preferred embodiment of the present invention, the various OOP objects used within the tributary unit 74 to manage calls will now be discussed in more detail with reference to FIG. 9. FIG. 9 is a schematic diagram illustrating how the various OOP object instances created within the TU interact with one another. Within the TU, a call manager object 700 is created in order to manage the various call objects that will be used to represent calls. Each time a call is received by the TU from either the telephone network or from a subscriber terminal, the call manager employs a 'Create' method in order to generate a call object to represent the call. Further, the call manager creates a call list which contains for each call instance generated by the call manager, a pointer to the call object created.

Each call object 720 created by the call manager 700 will be responsible for handling all events (signalling messages sent to the Host) that are specific to that call. Each call object contains a number of attribute fields for storing attributes specific to the call. These attributes will determine how the call is handled. At least one of the attributes will be provided within the call information used by the call manager 700 to create the call object 720. However, other attributes can be determined by the call object 720 by referring to a matrix of other OOP objects provided within the TU.

One of these objects to which the call object 720 may refer is a phonelist object 750, the phone list object being used to store a list of phone numbers for subscriber telecommunications equipment, and to associate those phone numbers with particular line list objects. A line list object 780 contains a list of pointers to line objects representing lines that can be used to communicate with the subscriber telecommunications equipment identified by the phone number. The line OOP object 800 contains various parameters specific to that line, such as a pointer to the Digital Subscriber Loop (DSL) object 810 with which that line is associated.

The DSL object 810 represents the resource between the central terminal and both the exchange and the subscriber terminals. Hence, in the arrangement of the preferred embodiment, there will be one DSL to represent the PRI connection between the exchange and the central terminal, and 15 DSLs to represent the 15 BRI connections between the central terminal and the subscriber telecommunications equipment supported by the 15 subscriber terminals. Each DSL object 810 includes an ID parameter identifying which DSL it represents (eg if ID=0, then the DSL object represents the PRI interface between the central terminal and the exchange, if ID=1 to 15, then the DSL represents the respective one of the 15 BRI interfaces between the central terminal and the telecommunications equipment of the subscriber terminals. The DSL object also includes a parameter giving the state of the resource (eg whether it is unconfigured or configured), and a pointer to a line list object 820, the line list object being a constituent of the DSL object 810.

The line OOP object 800 or DSL object 810, as appropriate, may include supplementary service details specific to the line or DSL, such as, whether incoming calls or outgoing calls are barred (on a per line basis), whether 'Advice of Charge' (AOC) service has been selected (on a per DSL basis), etc. This means that such services can now be specified on a per subscriber or per DSL basis. Previously, this was not possible and instead such services would be specified for particular stacks of subscribers at the exchange.

A channel map object 830 is also provided for maintaining the mapping between PRI B-channel and a subscriber line. In the case where fixed mapping exists, the channel map will always indicate which PRI B-channels map to which subscriber lines. Once a channel map object has been initialised, an 'Associate' method can be employed to associate the timeslot and PRI B-channel. A pointer to the channel map object 830 can be included in one of the attribute fields within a call object 720. When an event occurs specifying a particular PRI B-channel, a method within the channel map object can be invoked to return the line pointer for that specific PRI B-channel, the line pointer pointing to the relevant line object 840 identifying a particular line to be used.

For example, referring to FIG. 9, a PRI B-channel reference can be used to locate a particular entry in Column 831 of the channel map 830. This entry will then have a corresponding backplane time slot entry 832, along with an entry 833 indicating whether that timeslot is currently being used or not. Using the time slot entry 832, the corresponding backplane timeslot entry can be found in column 834, and this in turn will have a corresponding entry 835 identifying a line pointer. This BRI line pointer can then be returned to the call instance 720. It will be apparent to those skilled in the art that the channel map can also be traversed in the other direction to locate a particular PRI B-channel 836 from a BRI line pointer.

The channel map function should be used if a fixed mapping between PRI B-channel and backplane timeslot is used. Alternatively, if a phone number is included as one of the attributes of the call object 720, the line can be found using the phonelist object 750.

Having described the relationship between the various OOP objects, the manner in which these objects interact will be discussed with reference to some particular examples illustrated in FIGS. 10 to 12.

Figure 10:
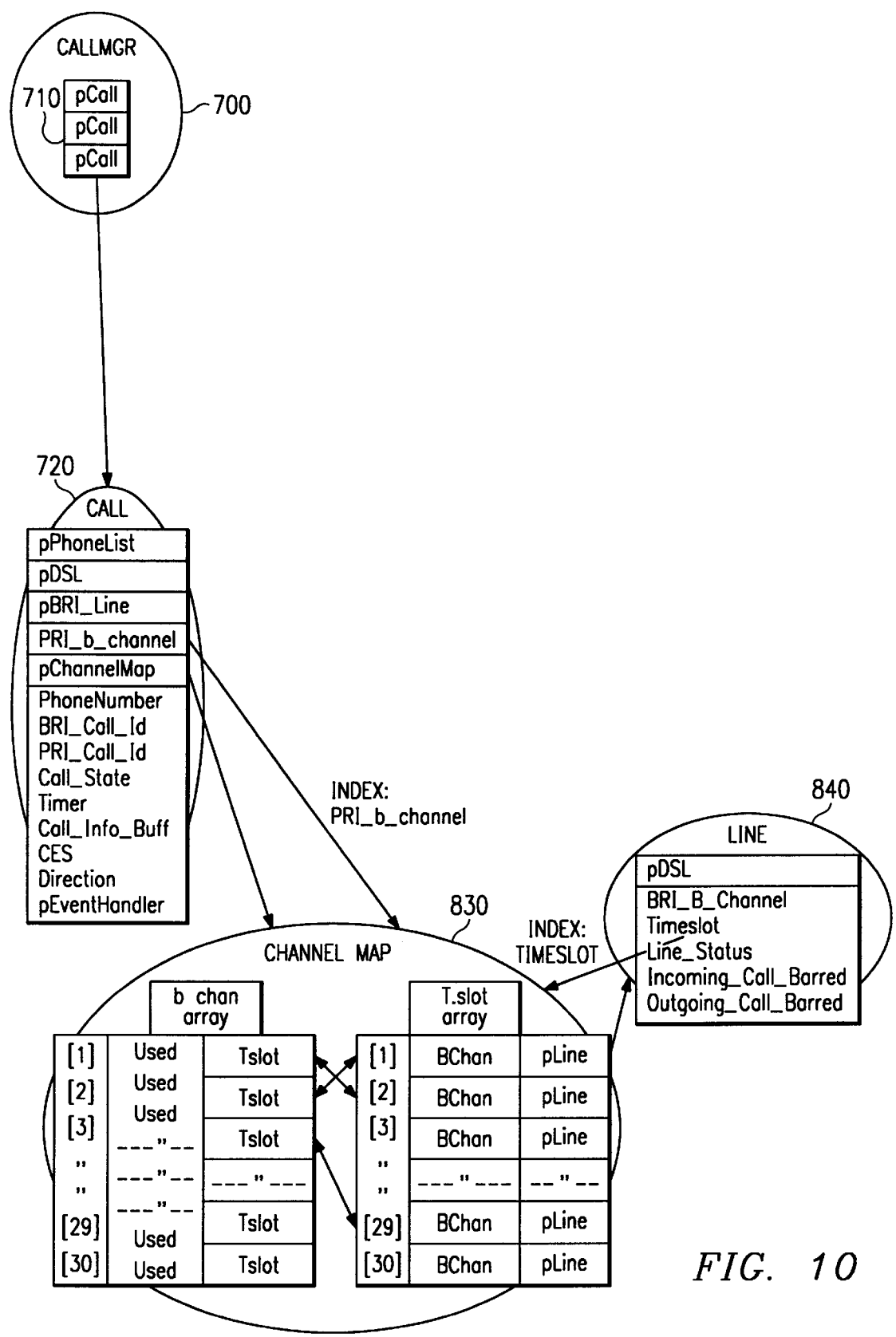
FIG. 10 is a diagram illustrating how the various software elements within the central terminal are used to manage a call from the exchange to a subscriber terminal in a situation where the phone number of the subscriber is not provided by the exchange.

FIG. 10 illustrates how the various OOP objects interact in a situation where a call is received by the central terminal from the exchange without a phone number being specified within the call information received by the central terminal. Upon receipt of the call, the call manager 700 creates a new call object 720 and stores the PRI B-channel negotiated at call set up as one of the attributes of the call object 720. The call object 720 will also be provided with a pointer to the channel map 830. A pointer to this new call object 720 will then be added to the call list 710 maintained by the call manager 700.

Once the new call object 720 has been created, the call manager 700 will execute an EventHandler function of the call object 720. This will cause the call object to use the PRI B-channel attribute as an index within the channel map 830 in order to establish a line to be used for the call. The line will be represented by a line object 840, a pointer to that line object being contained within the channel map 830. In this manner, a pointer to the BRI line object 840 can be added as an attribute of the call object 720.

Figure 11:
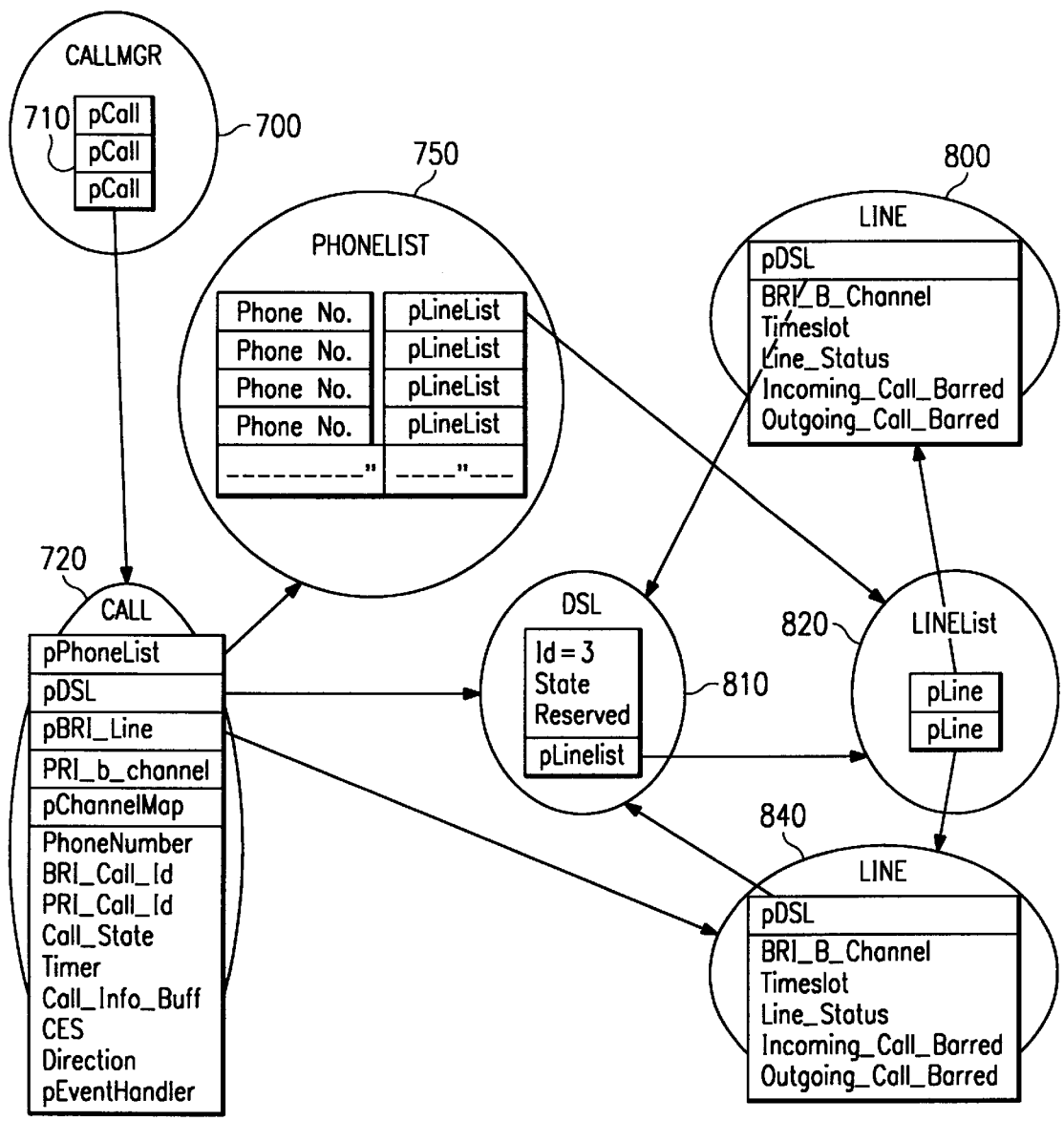
FIG. 11 is a diagram illustrating how the various software elements within the central terminal are used to manage a call from the exchange to a subscriber terminal in a situation where the phone number of the subscriber is provided by the exchange.

FIG. 11 illustrates how the various objects interact in a situation where a call is received by the central terminal from the exchange, this call including a phone number within the call information. Upon receipt of the call, the call manager 700 creates a new call object 720 and stores as attributes of that call object the data supplied in the call setup message. This data will include the phone number of the subscriber terminal to which the call is directed. A pointer to the new call object 720 will then be added to the call list 710 maintained by the call manager 700.

The call manager 700 will then call the EventHandler function of the call object 720, this causing the call object to reference the phone list 750 in order to match its phone number with one of the phone numbers in the phone list 750. A pointer to the phone list 750 will have been included as one of the attributes of the call object 720 when the call object 720 was created. By matching the phone number with one of the phone numbers in the phone list 750, the call object 720 will retrieve an associated line list pointer stored as part of the phone list 750. The call object 720 will then use the line list pointer to reference the line list 820 in order to retrieve pointers to particular line objects 800, 840 representing lines that may be used for the call. The call object 720 will use these pointers to line objects to find a free line, and to find the corresponding DSL object 810 pointed to by the free line object. A pointer to the DSL object 810 and to the free line 800, 840 will then be stored as attributes within the call object 720. By this approach, the phone number provided during the call setup can be used to identify a particular DSL and line to be used for the call, without needing to reference the channel map.

Figure 12:
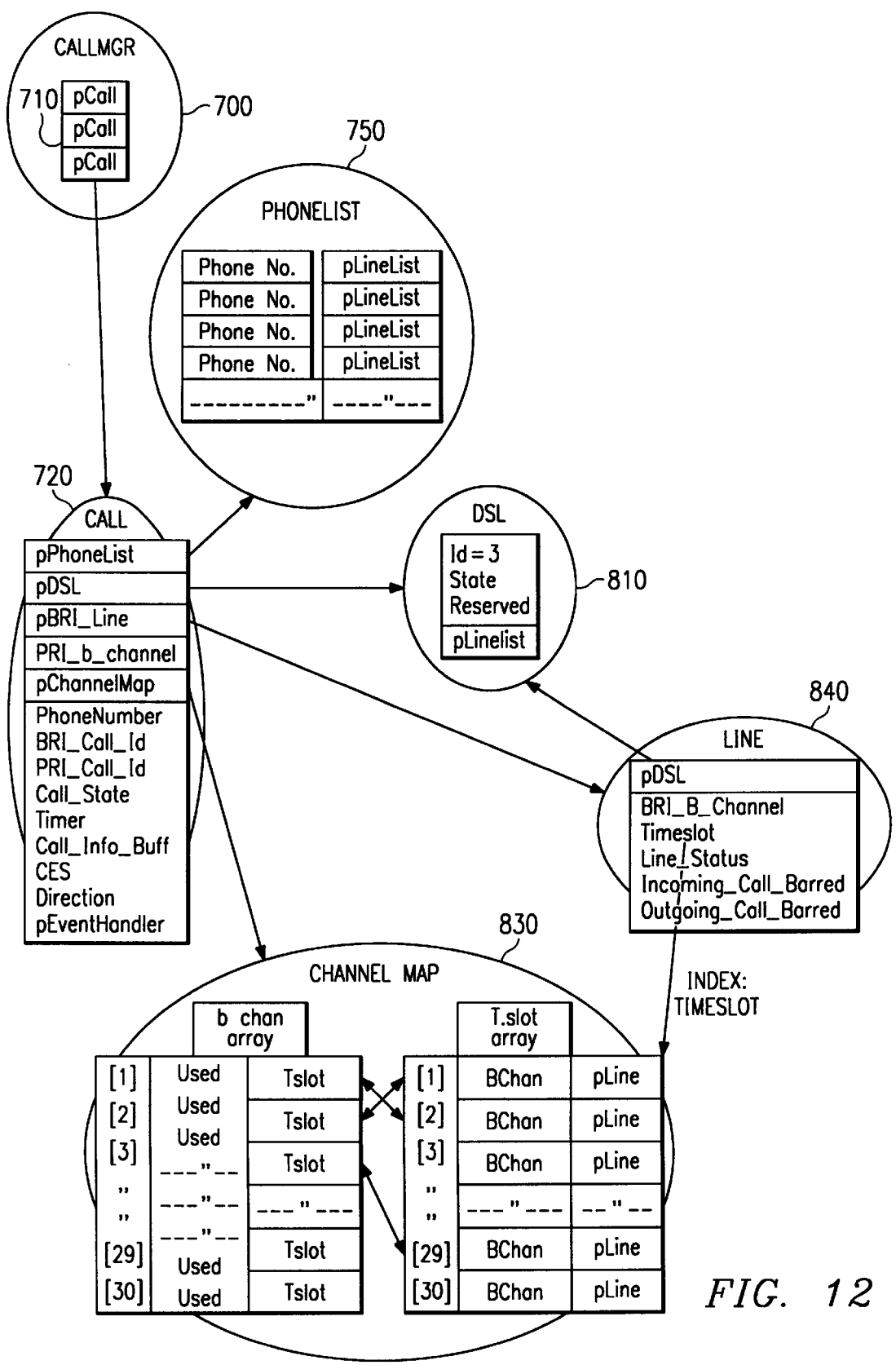
FIG. 12 is a diagram illustrating how the various software elements within the central terminal are used to manage a call from a subscriber terminal to the exchange.

FIG. 12 illustrates the interaction between the various objects in situations when a call is received by the central terminal from a subscriber terminal. When the call is received by the central terminal, the call manager 700 will create a new call object 720 and will store as attributes of that call object the dialled phone number, and the calling line. A pointer to the new call object 720 will then be added to the call list 710 maintained by the call manager 700.

Once the call object 720 has been created the call manager will execute the EventHandler function of the call object 720. If the call is directed via the exchange and fixed mapping is used, the call object 720 will use the line attribute and the pointer to the channel map 830 to determine which time slot the line is on and to use the channel map 830 to find the corresponding B-channel. The pointer to this PRI B-channel will then be added to the call object 720.

If the call from the subscriber terminal is actually directed to another subscriber terminal supported by the same central terminal, then in preferred embodiments of the present invention the central terminal is able to route that call directly to the other subscriber terminal without going via the exchange. In such situations, the phone number provided when the call object 720 is created will be compared by the call object 720 with the phone numbers in the phone list 750. If the phone number matches one of the phone numbers in the phone list 750, then a pointer to the appropriate line list can be retrieved, and then, as discussed earlier with reference to FIG. 11, the call object will be able to establish a free line and the corresponding DSL, and to store a pointer to that line and the DSL objects within the call object 720.

Hence, by providing a phone list located at the central terminal, and then providing some logic to compare destination phone numbers included in calls from the ST with those phone numbers in the phone list 750, it is possible for the central terminal to route calls between subscriber terminals directly without sending such calls via the exchange. This significantly improves the functionality of the central terminal within the wireless telecommunications system.

One drawback that may occur when the central terminal is given the flexibility to route calls internally without reference to the exchange is that the automatic call logging facility that would typically be provided at the exchange to keep a record of calls made through it will no longer be able to keep accurate records of calls to or from subscriber telecommunications equipment of subscriber terminals connected to such a central terminal. Calls passing via the exchange will be logged as normal, whereas those calls routed internally by the central terminal will not be logged. This is an important issue, since client billing is based on such logs of calls, and statistical data about the telephone network can also be derived from such logs.

In order to overcome this problem, in preferred embodiments of the present invention, the system as discussed above can be altered slightly in order to enable the CT to log call data for subsequent access by external applications, so that, for example, calls can be billed correctly irrespective of whether they have been routed in the normal fashion via the exchange or have been routed internally through the CT. The manner in which the central terminal performs such call logging will be discussed with reference to FIGS. 13 and 14, which illustrate the call instances used to represent a call from one ST to another ST via the CT.

Figure 13:
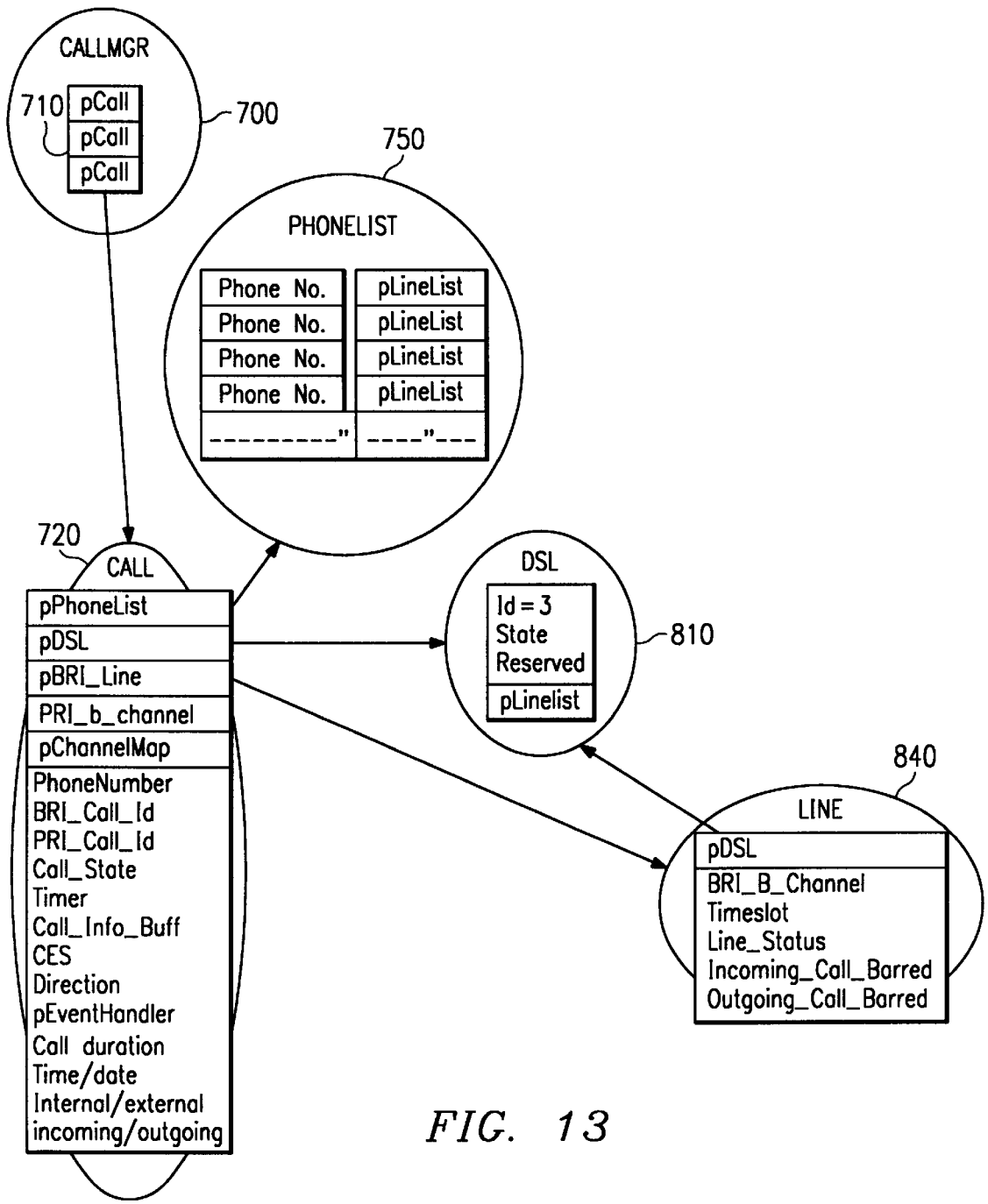
FIG. 13 illustrates how a call instance is used to store information which can be used to establish a call log in accordance with preferred embodiments of the present invention.

When the call manager receives a call from an ST, then it sets up a call instance as illustrated in FIG. 13 to represent that outgoing call. If the central terminal is arranged to perform call logging in addition to the call routing facilities discussed earlier, then the call instance set up by the call manager will be the same as that previously discussed with relation to FIGS. 9 to 12, except that it will be arranged to store some additional attributes required for the purposes of call logging. As can be seen from FIG. 13, in preferred embodiments, these additional attributes include a call duration attribute 702, a time and date attribute 704 identifying the time and date at which the call was commenced, an attribute 706 identifying whether the call instance represents a call that is internal (i.e. between the CT and the ST) or external (i.e. between the exchange and the CT), and an attribute 708 to indicate whether the call is an incoming call or an outgoing call.

As regards the time and date attribute, it will be apparent that this could be arranged to record one of a number of different events in the call process. For call billing purposes, it will need to record the time and date at which the actual call was commenced (as indicated by the destination telecommunications equipment answering the call), and in preferred embodiments, this is the only information recorded by the time and date attribute. However, it could initially indicate the time and date at which the call instance was created. If the call is answered, this could be overwritten by the time and date at which the call was answered (or alternatively a second time and date attribute could be used to store this information), but if the call was not answered, the time and date at which the call instance was created would be retained, this possibly being of interest for statistical purposes. Whichever of the above information is recorded as the time and date attribute, in preferred embodiments, the call duration attribute will only begin to store data when the call is actually answered, this information being required for call billing purposes.

In the case of a call from an ST to the CT, as indicated by FIG. 13, the internal/external attribute 706 will be set to internal, since the call instance created by the call manager represents a call from the ST to the CT, this being an internal call. Further, the incoming/outgoing attribute 708 will be set to outgoing, since the call instance represents an outgoing call from the ST.

Hence, with reference to FIG. 13, when a call from a subscriber terminal is received by the host application 550 (discussed earlier with reference to FIG. 8) of the central terminal, the call manager 700 will be instructed by the host application to create a new call object 720 and will store as attributes of that call object the dialled phone number, the calling line, an attribute identifying that the call is an internal call, an attribute identifying that the call is an outgoing call, and an attribute for identifying the time and date at which the call represented by the call instance is commenced. A pointer to the new call object 720 will then be added to the call list 710 maintained by the call manager 700.

Once the call object 720 has been created, the call manager will execute the EventHandler function of the call object 720. The destination (ie. dialled) phone number provided when the call object 720 was created will be compared by the call object 720 with the phone numbers in the phone list 750. If the phone number matches one of the phone numbers in the phone list 750, then the destination phone number and the line list information 840 for the outgoing call (from ST originating the call to CT) will be supplied to the host application 550. The line list information 840 will provide the host application with details of the BRI B-channel and timeslot on which the call is received. The destination phone number information would then be provided by the host application to the call manager 700, in a form resembling an incoming call to the subscriber telecommunications equipment identified by the destination phone number.

Figure 14:
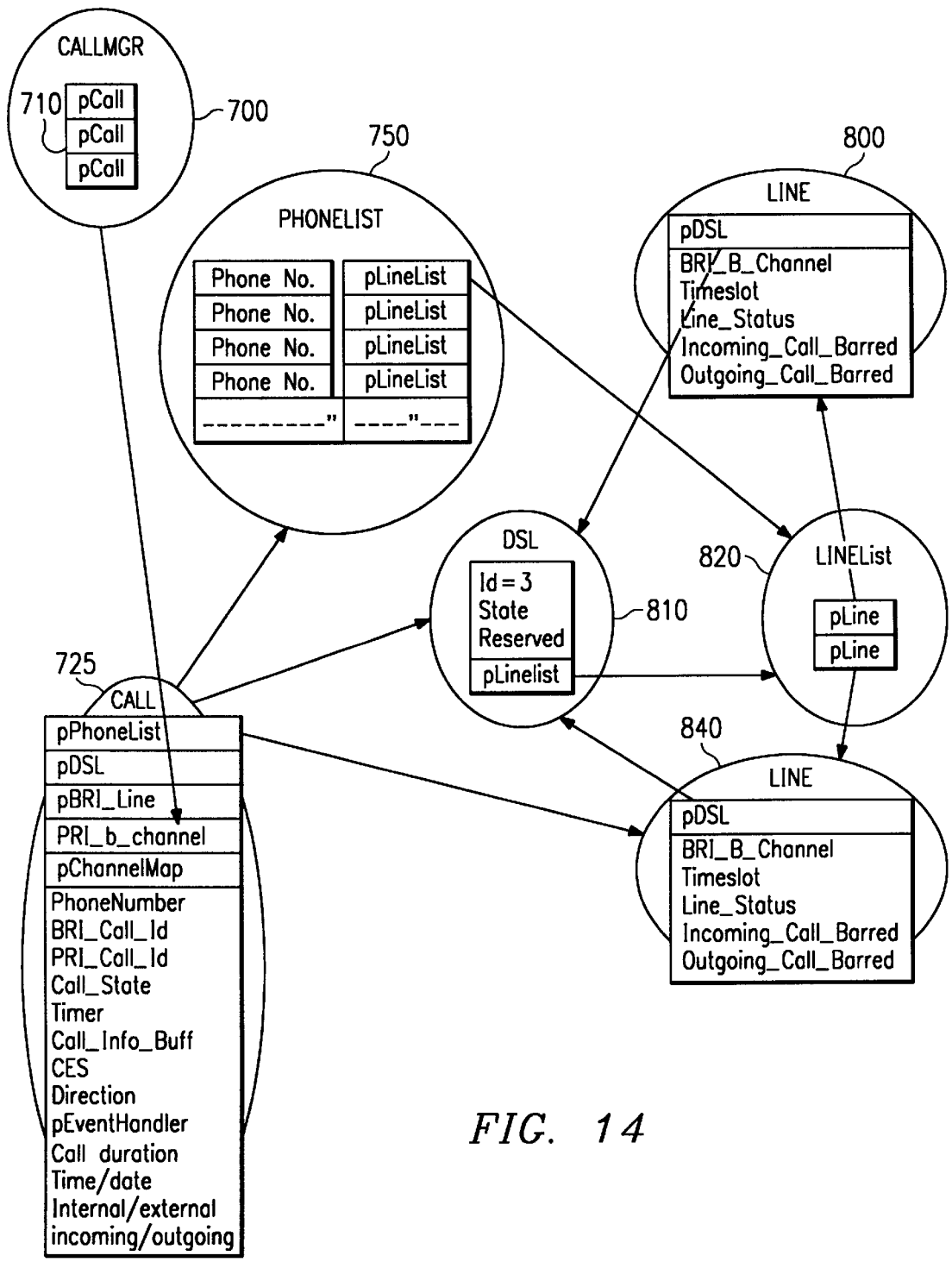
FIG. 14 illustrates how a call instance is used to store information which can be used to establish a call log in accordance with preferred embodiments of the present invention.

The receipt of this information will cause the call manager to create a second call instance to represent the incoming call to the destination subscriber terminal, this call instance being represented in FIG. 14. As shown in FIG. 14, upon receipt of the call, the call manager 700 creates a second call object 725, and stores as attributes of that call object the data supplied in the call set up message, such attributes identifying the phone number of the destination subscriber telecommunications equipment, identifying that the call is an incoming call, identifying that the call is an internal call (i.e. between CT and ST), and identifying the time and date at which the call represented by call instance 725 is commenced (this information being added when the destination telecommunications equipment accepts the call). A pointer to the new call object 720 will then be added to the call list 710 maintained by the call manager 700.

The call manager 700 will then execute the EventHandler function of the call object 725, this causing the call object 725 to use the phone list 750 to match the destination phone number with a line list pointer in the phone list. The line list 820 is then referenced in order to retrieve pointers to particular line objects 800, 840 representing lines that may be used for the call. The call object 725 will use these pointers to line objects to find a free line, and to find the corresponding DSL object 810 pointed to by the free line object. A pointer to the DSL object 810 and to the free line object 800, 840 will then be stored as attributes within the call object 725.

During the course of the call, both call instances 720, 725 will update the call duration attribute to indicate the elapsed time of the call. When the ST that originated the call terminates the call, the attribute information is retrieved from the call instances by the call manager before the call instances are terminated. The call manager 700 then sends the information for each call instance to the host 550 within the tributary unit 74. It should be noted that the two call instances are treated separately for this purpose, so that two sets of information are passed to the host:, one for the incoming call and one for the outgoing call. The host application can then pass the information for both call instances to the shelf controller 72 where it can be stored in a call log. The call log maintained by the shelf controller can then be downloaded to an external application 530 when requested by that application. The external application can then use this log data to provide statistics about call activity, and to prepare billing information.

Although the above description of call logging concerned a call from one ST to another ST, it will be apparent that all calls passing through the central terminal can be logged using this mechanism, both internally/externally routed calls, and incoming/outgoing calls. The call log maintained by the shelf controller will in preferred embodiments contain the following information about all calls passing through the wireless system:

1 source telephone number (if an internal call);
2 destination phone number;
3 a time and date stamp for the start of the call;
4 call duration.

Whether a call is internally or externally routed, or an incoming or outgoing call, could be determined from the source and destination telephone numbers and the phone list, but in preferred embodiments this information is stored explicitly in the call instance for reasons of efficiency.

It will be apparent to those skilled in the art that the shelf controller can be arranged to store certain sub sets of the call information passed to it by the host 550. For example, it could be arranged to only log internal calls, since external calls will be passed via the exchange, and the call logging procedures provided by the exchange will log the necessary information about those external calls. Additionally, the log maintained by the shelf controller could store outgoing calls separately to incoming calls. This maybe useful, since, for example, it is only generally the outgoing calls that will be billed, and hence storing that information separately maybe more expedient. An external billing application would then be able to just request the log of outgoing calls.

It will be apparent from the above description of FIGS. 13 and 14 that very little change is required to the object structure discussed earlier in order to allow the central terminal to log the necessary information about calls routed through it in order to ensure that accurate information is available for the purposes of billing, statistics, etc. With reference to FIG. 8, no changes are required to the elements of the central terminal shown in FIG. 8 in order to support call logging. When a call from a particular ST is received on a particular BRI connection, then the signalling information will be passed through the corresponding signalling stack 580, 582, 584, 586 to generate a call control message for the host application 550. The host application 550 will then pass the necessary D-channel information via a call control message through the signalling stack 580, 582, 584, 586 associated with the BRI connection to the destination ST. Additionally, the host application 550 will communicate with the bearer channel switch hardware 590 so that the switch hardware switches bearer data from the incoming BRI B-channel to the appropriate outgoing BRI B-channel to the destination ST. Hence, the bearer channel switch 590 will route the data internally, without passing it through to the exchange 500.

From the above description, :Lt will be apparent that the central terminal can be arranged such that it can perform its own internal routing of calls between subscriber terminals supported by that central terminal, the central terminal also having the capability to log the necessary information about those calls that may be required by remote applications for the purposes of billing, statistics, etc.

Although the above description has discussed a call log used to store data concerning completed calls, it will be apparent that a call log of calls in progress could also be stored by arranging the call manager to periodically poll all call instances representing calls in progress. The call manager could be arranged tc perform this polling on demand from an external application such as a statistics gathering application.

Having discussed the OOP objects used in the preferred embodiment of the present invention, the various classes from which these objects are derived will now be described in more detail.

1) Call Manager Class

The Call Manager 700 will, in preferred embodiments, create, maintain, and destroy the CALL objects 720 within the system. It acts as a call demux, routing any given message to the correct call object. The following illustrates how the call manager class may be defined:

Data Structure

```
typedef struct CALLMGRStruct
{
SCIptr              pSci;
PHONELISTptr        pPhoneList;
CHANNELMAPptr       pChannelMap;
DSLLISTptr          pDslList;
CALLLISTptr         pCallList;
BOOLEAN             SignallingActive;
BOOLEAN             IncomingBarred;
BOOLEAN             OutgoingBarred;
CALL_ID_TYPE        CallIdSource;
} CALLMGR;
```

Allocation of Memory
PRIVATE CALLMGR CallMgrMemoryBlocks
  [MAX_CALLMANAGER_OBJECTS];
PRIVATE BOOLEAN CallMgrInUse [MAY$_{13}$
  CALLMANAGER_OBJECTS];

Construction and Destruction
PUBLIC CALLMGRptr CALLMGR_Create
  (PHONELISTptr pPhoneList,
CHANNELMAPptr pChannelMap,
DSLLISTptr pDslList);
PUBLIC void CALLMGR_Destroy (CALLMGRptr
  pCallMgr);
Access Methods
PUBLIC CHANNELMAPptr CALLMGR_
  GetChannelMap (CALLMGRptr
  pCallMgr);
PUBLIC DSLLISTptr CALLMGR_GetDslList
  (CALLMGRptr pCallMgr);
PUBLIC BOOLEAN CALLMGR_GetIncomingBarred
  (CALLMGRptr pCallMgr);
PUBLIC BOOLEAN CALLMGR_GetOutgoingBarred
  (CALLMGRptr pCallMgr);
PUBLIC PHONELISTptr CALLMGR_GetPhoneList
  (CALLMGRptr pCallMgr);
PUBLIC SCIptr CALLMGR_GetSci (CALLMGRptr
  pCallMgr);
PUBLIC BOOLEAN CALLMGR_GetSignallingActive
  (CALLMGRptr pCallMgr);
PUBLIC void CALLMGR_SetIncomingBarred
  (CALLMGRptr pCallMgr,
BOOLEAN IncomingBarred);
PUBLIC void CALLMGR_SetOutgoingBarred
  (CALLMGRptr pCallMgr,
BOOLEAN OutgoingBarred);
PUBLIC void CALLMGR_SetSignallingActive
  (CALLMGRptr pCallMgr,
BOOLEAN SignallingActive);
Public Services
PUBLIC void CALLMGR_AcceptEvent (CALLMGRptr
  pCallMgr,
  PKG_ID
  Event);
This service extracts the call identifier from the received event, and then searches through the call list in search of a call object with a matching identifier. If not found, the Call Manager creates a new call object with the appropriate identifier. The event is then passed on to the appropriate call object for further processing.
PUBLIC void CALLMGR_ClearDsl (CALLMGRptr
  pCallMgr, DSLptr pDsl);
This service runs through the call list, and clears any calls that are using the specified DSL.
PUBLIC void CALLMGR_ClearLine (CALLMGRptr
  pCallMgr, LINEptr pLine);
This service runs through the call list, and clears any calls that are using the specified line. There should be only one at the most.
PUBLIC BOOLEAN CALLMGR_DslIsBusy
  (CALLMGRptr pCallMgr, DSLptr
pDsl);
This service answers the query "are any current calls using this DSL?".
PUBLIC CALL_ID_TYPE CALLMGR_GetNewCallId
  (CALLMGRptr pCallMgr);
The Call Manager is responsible for ensuring that any calls originated by the TU have a unique call identifier. This call identifier has local scope only (ie. only relevant within the TU). CALLMGR_GetNewCallId( ) will return a unique identifier.
2) Call Class
Each call object 720 will be responsible for handling all events (signalling messages sent to the Host) that are specific to that call. The call state at any instant is represented by the current call event handler. The event handler of the call is updated to reflect any changes of call state as they occur.

The maximum number of calls may be greater than the number of available channels. This is because all subscriber lines may be connected with active calls and another setup sent to any one or more subscribers. The setup should be sent to the user who may wish to put the current caller on hold and speak to the person trying to get through. The following illustrates how the call class may be defined:

Data Structure

```
typedef struct_KEYPAD_STATE
{
BOOL                            Initialised;
char                            BufferedDigits
[MAX_INVOKE_STRING_LEN+1];
int                             NumBufferedDigits;
KEYPAD_INVOKESTATE              InvokeStringState;
CARDMGRptr                      pCardMgr;
CMTIMER_INDEX_TYPE              TimerIndex;
} KEYPAD_STATE, *PKEYPAD_STATE;
typedef enum
{
CC_UNDEFINED,
CC_BRI_COMMAND,
CC_PRI_COMMAND,
CC_UNIFIED
} CC_INTERFACE_TYPE;
typedef struct tagHalfCallData
{
CALL_ID_TYPE                    CallId;
DSL_ID_TYPE                     DslId;
CES_TYPE                        Ces;
B_CHANNEL_TYPE                  RequestedBChannel;
B_CHANNEL_TYPE                  UsedBChannel;
CHANNEL_INDICATION_TYPE         ChannelIndication;
DSLptr                          pDsl;
LINEptr                         pLine;
PHONE_NUMBER_TYPE               IsdnNumber;
SUBADDRESS_TYPE                 Subaddress;
KEYPAD_STATE                    KeypadState;
CC_INTERFACE_TYPE               CcInterface;
} THalfCallData;
typedef enum
{
CALL_IDLE = 0
CALL_INCOMING_NEW,
CALL_INCOMING_CHAN_NEG,
CALL_INCOMING_CHAN_BUSY,
CALL_INCOMING_OVERLAP,
CALL_INCOMING_OVERLAP_CHAN_NEG,
CALL_INCOMING_OVERLAP_CHAN BUSY,
CALL_OUTGOING_NEW,
CALL_OUTGOING_SUPPSERV_RESPONSE,
CALL_OUTGOING_CHAN_NEG,
CALL_ESTABLISHING,
CALL_ACTIVE,
CALL_CLEARING,
CALL_CLEARING_CALLER,
CALL_CLEARING_CALLED,
NUM_CALL_STATES
} CALL_STATE_TYPE;
typedef enum
{
AUX_IDLE,
AUX_CALL_HELD
} AUX_STATE_TYPE;
typedef struct CALLstruct
THalfCallData                   Caller;
THalfCallData                   Called;
CALLMGRptr                      pCallMqr;
INT16                           Timer;
BYTE                            CallInfoBuffer;
DIRECTION_TYPE                  Direction;
CONNECT_STATE_TYPE              ConnectState;
```

-continued

```
CALL_STATE_TYPE                 State;
AUX_STATE_TYPE                  AuxState;
EVENT_HANDLER                   (*EventHandler) (CALLptr pCall,
PKG_ID Event);
} CALL;
```

If the call logging feature of preferred embodiments of the present invention is to be provided, then the typedef for 'CALLstruct' also includes an additional entry in the above list, namely:

```
CALL_LOG                        log;
```

The CALL_LOG structure may be defined as follows:

```
typedef struct CALL_LOG
{
INT16                           day;
INT16                           month;
INT16                           year;
INT16                           hour;
INT16                           mins;
BOOL                            Int_Ext;
BOOL                            Out_In;
INT32                           Duration;
} CALL_LOG
```

Allocation of Memory
PRIVATE CALL CallMemoryBlocks [MAX$_1$_CALL_OBJECTS];
PRIVATE BOOLEAN CallInUse [MAX_CALL_OBJECTS];
The elements of the array should never be accessed directly within the call module, but rather the array should be regarded as a memory pool for use only by the call create and destroy functions.
Construction and Destruction
PUBLIC CALLptr CALL_Create(CALLMGRptr pCallMgr, PKG_ID Event);
This creates a new call object based on the information contained in Event.
PUBLIC void CALL$_1$_Destroy(CALLptr pCall);
Access Methods
PUBLIC DIRECTION_TYPE CALL_GetDirection (CALLptr pCall);
PUBLIC BOOLEAN CALL_IsConnected (CALLptr pCall);
PUBLIC CALLMGRptr CALL_GetMgr (CALLptr pCall);
PUBLIC THalfCallData *CALL_GetCallerData (CALLptr pCall);
PUBLIC THalfCallData *CALL_GetCalledData (CALLptr pCall);
PUBLIC THalfCallData *CALL_GetThisCallData (CALLptr pCall,
 DSL_ID_TYPE DslId,
 CALL_ID_TYPE CallId);
PUBLIC THalfCallData *CALL_GetOtherCallData (CALLptr pCall,
 DSL_ID_TYPE DslId,
 CALL_ID_TYPE CallId);
PUBLIC THalfCallData *CALL_GetBriCallData (CALLptr pCall);

PUBLIC THalfCallData *CALL_GetPriCallData (CALLptr pCall);

Public Services

PUBLIC EVENT_HANDLER CALL_AcceptEvenat (CALLptr pCall, p1PKG_ID Event);

This represents the entry point for an event to a call object. A received, non-global event will be passed up to a call object through this function. Only the Call Manager will ever call this function.

PUBLIC void CALL_Clear (CALLptr pCall);

As the name suggests, this function will start to tear down a call. The Call Manager uses this function from within CALLMGR_ClearLine( ) and CALLMGR_ClearDsl( ).

PUBLIC CALL_SOURCE-TYPE CALL GetSource (CALLptr pCall, p1DSL_ID_TYPE DslId, p1CALL_ID_TYPE CallId);

This returns either SOURCE_CALLER, SOURCE_CALLED, or SOURCE_UNKNOWN depending on whether the DSL identifier and call identifier match with those in the caller data, the called data, or neither respectively.

PUBLIC BOOLEAN CALL_MatchEvent (CALLptr pCall, PKG_ID Event);

This tests whether the data contained in the event matches that stored by the call object.

PUBLIC void CALL-TimerExpired (CALLptr pCall);

This is called on receipt of a timer expiry primitive that is used to indicate that a call has remained in what should have been a transient state for too long. An example might be a call that has been in a channel negotiation state for one minute.

3) Channel Map Class

The Channel Map class 830 is responsible for maintaining a database of B-channels that are currently connected. It also provides a functional interface to the Digital Switch Driver (DSD). The following illustrates how the channel map may be defined:

Data Structure

```
typedef struct LINEPAIRstruct
{
LINEptr pLine1;
LINEptr pLine2;
} LINE_PAIR_TYPE;
typedef struct CHANNELMAPstruct
{
DSDptr                      pDsd;
LINE_PAIR_TYPE LinePair [(MAX_LINE_OBJECTS/2)+1];
} CHANNELMAP;
```

Allocation of Memory

MAX_CHANNELMAP_OBJECTS will be defined as 1.

PRIVATE CHANNELMAP ChannelMapMemory:Blocks p1[MAX_CHANNELMAP_OBJECTS];

PRIVATE BOOLEAN ChannelMapInUse [MAX_CHANNELMAP_OBJECTS];

Construction and Destruction

The channel map is constructed by the Host for the Call Manager, and in preferred embodiments is never destroyed.

PUBLIC CHANNELMAPptr CHANNELMAP_Create (DSDptr pDSD);

Access Methods

The Channel Map class offers no access methods in preferred embodiments of the present invention.

Public Services

PUBLIC BOOLEAN CHANNELMAP_Connect (CHANNELMAPptr p1pChannelMap,
LINEptr pLine1,
LINEptr pLine2);

This service connects the two specified lines if possible. It fails if the Channel Map is full, or if one or both of the requested lines are already connected to another line, or if the DSD fails to connect the lines for any reason.

PUBLIC BOOLEAN CHANNELMAP_Disconnect (CHANNELMAPptr
pChannelMap,
LINEptr pLine1,
LINEptr pLine2);

This disconnects the two specified Lines if possible. It fails if the two lines are not currently connected together, or if the DSD fails to disconnect the lines for any reason.

4) PhoneList and Number Classes

The PHONELIST class 750 is a database class containing records of class NUMBER. Basically its job is to maintain a mapping between a subscriber's ISDN number and an appropriate line list. It presents sufficient query methods to allow the TU software to route incoming calls to an appropriate B-channel on the subscriber's access. It is preferably configured through the Shelf Controller Interface.

Data is included that allows a particular entry in the PhoneList to represent a range of ISDN numbers. This allows Direct Dial-In (DDI) to be simulated efficiently by the central terminal, requiring a minimum of storage space. Also, it is possible to have any entry in the PhoneList 'forward' to any other entry (or to any other LineList). This allows intelligent: simulation of Call Forwarding Unconditional (CFU). There is only one object of the PhoneList class in the system. It is created by the Host for the Call Manager. The following illustrates how the Phonelist class may be defined:

Data Structure

```
typedef enum
{
NUMBER_BAD,
NUMBER_GOOD,
NUMBER_INCOMPLETE
} NUMBER_STATE_TYPE;
typedef enum
{
NOT_FORWARDED,
FORWARD_INTERNAL,
FORWARD_EXTERNAL
} FWD_TYPE;
typedef struct NUMBERstruct
{
BOOLEAN             IsRange;
BYTE                Reference;
PHONE_NUMBER_TYPE   PhoneNumber;
PHONE_NUMBER_TYPE   PhoneNumberMax;
LINELISTptr         pLineList;
FWD_TYPE            ForwardIndicator;
union Forwardunion
{
NUMBERptr           pFNumber;
LINELISTptr         pFLineList;
} Forward;
PHONE_NUMBER_TYPE   ForwardPhoneNumber;
SUBADDRESS_TYPE     ForwardSubaddress;
} NUMBER;
typedef struct PHONELISTstruct
```

-continued

```
{
NUMBERLISTptr       pNumberList;
LINELISTptr         pDefaultForwardLineList;
UINT                MinimumRequiredDigits;
UINT                NumberLength;
} PHONELIST;
```

Allocation of Memory
PRIVATE NUMBER NumberMemoryBlocks [MAX_NUMBER_OBJECTS];
PRIVATE BOOLEAN NumberInUse [MAX_NUMBER_OBJECTS];
PRIVATE PHONELIST PhoneListMemoryBlocks [MAX-PHONELIST-OBJECTS];
PRIVATE BOOLEAN PhoneListInUse [MAX_PHONELIST_OBJECTS];
In preferred embodiments, MAX_NUMBER_OBJECTS is 100, and MAX_PHONELIST_OBJECTS is 1.
Construction and Destruction
The Phone list is constructed by the Host on behalf of the Call Manager. In preferred embodiments, it is never destroyed.
PUBLIC PHONELISTptr PHONELIST_Create(DSLptr pDefaultForwardDsl);
The default DSL for forwarding will, in the current system, always be the PRI DSL. This is the DSL on which the forwarded part of a forwarded call will be made, unless a different one is specified when forwarding is activated.
Access Methods
PUBLIC void PHONELIST_SetMinRequiredDigits
  (PHONELISTptr pPhoneList,
  BYTE NumDigits);
PUBLIC BOOL PHONELIST_SetRangeMax
  (PHONELISTptr pPhoneList,
NUMBERptr pNumber,
PHONE_NUMBER_TYPE
PhoneNumberMax);
PUBLIC char *PHONELIST_GetPhoneNumber
  (PHONELISTptr pPhoneList,
NUMBERptr pNumber,
PHONE_NUMBER_TYPE
PhoneNumber);
PUBLIC BOOLEAN PHONELIST_SetNumberForwarding (PHONELISTptr
  pPhoneList,
    NUMBERptr
pNumber,
PHONE_NUMBER-TYPE FwdToNum,
SUBADDRESS_TYPE *pFwdToSub,
  SCIptr
pSci);
PUBLIC void PHONELIST_ClearNumberForwarding
  (PHONELISTptr pPhoneList,
    NUMBERptr
pNumber,
  SCIptr
pSci);
PUBLIC FWD_TYPE PHONELIST_GetNumberForwarding (PHONELISTptr
  pPhoneList,
    NUMBERptr
pNumber,
PHONE_NUMBER_TYPE FwdToNum,
SUBADDRESS_TYPE *pFwdToSub);

Public Services
PUBLIC NUMBERptr PHONELIST_AddNumber
  (PHONELISTptr pPhoneList,
  BYTE Reference,
  PHONE_NUMBER_TYPE
  PhoneNumber);
This adds a Number to the PhoneList. The reference is an abstract number generated by the Shelf Controller. It is used at configuration time to speed up the process, and improve the efficiency of the communication between the Shelf Controller and the TU.
PUBLIC void PHONELIST_RemoveNumber
  (PHONELISTptr pPhoneList,
  NUMBERptr pNumber);
This simply removes the indicated Number from the PhoneList (if possible).
PUBLIC BOOLEAN PHONELIST_AddLine
  (PHONELISTptr pPhoneList,
  NUMBERptr pNumber,
  LINEptr pLine);
This adds the indicated Line to the specified Number's LineList.
PUBLIC BOOLEAN PHONELIST_RemoveLine
  (PHONELISTptr pPhoneList,
  NUMBERptr Reference,
  LINEptr pLine);
This removes the specified Line from the indicated Number's LineList. If there are no remaining Lines following this operation, the Number's entry shall be removed from the PhoneList.
PUBLIC BOOLEAN PHONELIST_NumberIsEmpty
  (PHONELISTptr pPhoneList,
  NUMBERptr pNumber);
This answers the query "Does this Number have no Lines in its LineList?".
PUBLIC NUMBERptr PHONELIST_GetNumberFromPhoneNumber
  (PHONELISTptr pPhoneList,
  PHONE_NUMBER_TYPE PhoneNumber,
  BOOLEAN PermitForwarding);
This returns a pointer to the Number in the PhoneList that contains the ISDN number requested (NULL if not found).
PUBLIC NUMBERptr PHONELIST_GetNumberFromReference (PHONELISTptr
  pPhoneList,
  BYTE Reference);
This returns a pointer to the Number in the PhoneList that has the specified reference (NULL if not found).
PUBLIC NUMBERLISTptr PHONELIST_GetNumbersOnDsl (PHONELISTptr
  pPhoneList,
  DSLptr pDsl);
This creates a NumberList, and fills it with any Numbers that are routed to any channel of the specified DSL. Note that the caller of this function is responsible for destroying the NumberList after use.
5) List Class
This is a generic container class with the ability to add items, remove items, and iterate through items. The following illustrates how the list class may be defined:

Data Structure

```
typedef struct ITEMstruct
{
ITEMptr pNextItem;
OBJECTptr pObject;
} ITEM, *ITEMptr;
typedef struct LISTstruct
ITEMptr pFirstItem;
ITEMptr pCurrentItem;
} LIST;
```

Allocation of Memory
PRIVATE LIST ListMemoryBlocks [MAX_LIST_OBJECTS];
PRIVATE ITEM ItemMemoryBlocks [MAX_ITEM_OBJECTS];
PRIVATE BOOLEAN ListInUse [MAX_LIST_OBJECTS];
PRIVATE BOOLEAN ItemInUse [MAX_ITEM_OBJECTS];
PRIVATE ITEM DummyItem={&DummyItem, NULL};
PRIVATE ITEMptr pDummyItem =&DummyItem;
Construction and Destruction
PUBLIC LISTptr LIST_Create(void);
PUBLIC void LIST_Destroy (LISTptr pList);
Access Methods
PUBLIC BOOLEAN LIST_Add (LISTptr pList, OBJECTptr pObject);
PUBLIC BOOLEAN LIST_AddTail (LISTptr pList, OBJECTptr pObject);
PUBLIC BOOLEAN LIST_Remove (LISTptr pList, OBJECTptr pObject);
PUBLIC OBJECTptr LIST_Current(LISTptr pList);
This returns the current item from the specified List.
NULL if at the end.
Public Services
PUBLIC void LIST_Start(LISTptr pList);
This sets an internal marker to the head of the List.
PUBLIC void LIST_Next(LISTptr pList);
This moves the internal marker on to the next item in the List.
PUBLIC BOOLEAN LIST_IsEmpty(LISTptr pList);
This answers the query "Does this List contain no items?".
6) DSL Class
The DSL class is used to describe an ISDN access. There is one DSL object constructed for every ISDN access. In the preferred embodiment, there will be fifteen BRI accesses, and one PRI access—hence sixteen DSL objects.
These objects are constructed by the Host, and placed in the care of the one and only DSL List in the system. The DSL List, in turn, is kept by the Call Manager.
The following illustrates how the DSL class may be defined:
Data Structure

```
typedef enum
{
LOWEST_DSL          = 0,
HIGHEST_DSL         = 15,
PRI_DSL             = 0,
LOWEST_BRI_DSL      = 1,
HIGHEST_BRI_DSL     = 15,
DSL_NONE            = 0xff,
DSL_0 = 0,
DSL_1,
DSL_2,
```

-continued

```
DSL_3,
DSL_4,
DSL_5,
DSL_6,
DSL_7,
DSL_8,
DSL_9,
DSL_10,
DSL_11,
DSL_12,
DSL_13,
DSL_14,
DSL_15,
DSL_ID_TYPE;
typedef struct DSLstruct
{
DSL_ID_TYPE               DslId;
BOOLEAN                   Activated;
BOOLEAN                   Reserved;
BOOLEAN                   IncomingBarred;
BOOLEAN                   OutgoingBarred;
unsigned long             ServicesSubscribed;
LINELISTptr               pLineList;
SUPPSERV_CUG_INDEX_TYPE   CugIndex
} DSL;                    [MAX_CUGS_PER_DSL];
```

Allocation of Memory
PRIVATE DSL DslMemoryBlocks [MAX_DSL_OBJECTS];
PRIVATE BOOLEAN DslInUse [MAX_DSL_OBJECTS];
Construction and Destruction
The DSL class is constructed by the Host, and in preferred embodiments is never destroyed.
PUBLIC DSLptr DSL_Create(DSL_ID_TYPE DslId);
Access Methods
PUBLIC BOOLEAN DSL_AddLine (DSLptr pDsl, LINEptr pLine);
PUBLIC BOOLEAN DSL_RemoveLine (DSLptr pDsl, LINEptr pLine);
PUBLIC LINELISTptr DSL_GetLineList (DSLptr pDsl);
PUBLIC LINEptr DSL_GetLine (DSLptr pDsl, B_CHANNEL_TYPE BChannel);
PUBLIC void DSL_Activate (DSLptr pDsl);
PUBLIC void DSL_Deactivate (DSLptr pDsl);
PUBLIC BOOLEAN DSL_IsActivated (DSLptr pDsl);
PUBLIC void DSL_Reserve (DSLptr pDsl);
PUBLIC void DSL_CancelReserve (DSLptr pDsl);
PUBLIC BOOLEAN DSL_IsReserved (DSLptr pDsl);
PUBLIC DSL_ID_TYPE DSL_GetDslId (DSLptr pDsl);
PUBLIC void DSL_SetIncomingBarred (DSLptr pDsl, BOOLEAN
IncomingBarred);
PUBLIC void DSL_SetOutgoingBarred (DSLptr pDsl, BOOLEAN
OutgoingBarred);
PUBLIC BOOLEAN DSL_IsAvailable (DSLptr pDsl, CALLptr pCall);
PUBLIC void DSL_SetServicesSubscribed (DSLptr pDsl, unsigned long ServicesToSet);
PUBLIC void DSL_ClearServicesSubscribed (DSLptr pDsl,
unsigned long ServicesToClear);
PUBLIC unsigned long DSL_GetServicesSubscribed (DSLptr pDsl);
PUBLIC BOOLEAN DSL_IsMemberOfCug (DSLptr pDsl,
  SUPPSERV_CUG_INDEX_TYPE
CugIndex);

```
PUBLIC BOOLEAN DSL_AddCugIndex (DSLptr pDsl,
    SUPPSERV_CUG_INDEX_TYPE
CugIndex);
PUBLIC BOOLEAN DSL_RemoveCugIndex. (DSLptr
    pDsl,
SUPPSERV_CUG_INDEX_TYPE CugIndex);
Public Services
```
The DSL class presents no public services in preferred embodiments of the present invention.

7) Line Class

Each DSL maintains a list of its lines. A Line object identifies a particular B-channel on a particular DSL. In preferred embodiments, each BRI DSL owns two lines, a PRI DSL owns thirty. The following illustrates how the line class may be defined:

Data Structure

```
typedef struct LiNEstruct
{
DSLptr                pParentDsl;
B_CHANNEL_TYPE        BChannel;
BOOLEAN               Activated;
BOOLEAN               Earmarked;
BOOLEAN               Busy;
BOOLEAN               IncomingBarred;
BOOLEAN               OutgoingBarred;
} LINE;
```

Allocation of Memory

```
PRIVATE LINE LineMemoryBlocks [MAX_LINE_
    OBJECTS];
PRIVATE BOOLEAN LineInUse [MAX_LINE_
    OBJECTS];
```

Construction and Destruction

Line objects will be created by the Host on behalf of each DSL.
```
PUBLIC LINEptr LINE_Create(DSLptr pParentDsl,
    B_CHANNEL_TYPE
    BChannel);
PUBLIC void LINE_Destroy(LINEptr pLine);
```
Access Methods
```
PUBLIC void LINE-SetIncomingBarred (LINEptr pLine,
    BOOLEAN
    IncomingBarred);
PUBLIC void LINE_SetOutgoingBarred. (LINEptr pLine,
    BOOLEAN
OutgoingBarred);
PUBLIC void LINE_Activate (LINEptr pLine);
PUBLIC void LINE Deactivate (LINEptr pLine);
PUBLIC BOOLEAN LINE_IsActivated (LINEptr pLine);
PUBLIC void LINE_Earmark (LINEptr pLine);
PUBLIC void LINE_CancelEarmark (LINEptr pLine);
PUBLIC BOOLEAN LINE_IsEarmarked (LINEptr pLine);
PUBLIC void LINE_SetBusy (LINEptr pLine);
PUBLIC void LINE_SetIdle (LINEptr pLine);
PUBLIC BOOLEAN LINE_IsBusy (LINEptr pLine);
PUBLIC B_CHANNEL_TYPE LINE_GetBChannel
    (LINEptr pLine);
PUBLIC DSLptr LINE_GetParentDsl (LINEptr pLine);
Public Services
PUBLIC BOOLEAN LINE-IsAvailable(LINEptr pLine,
    DIRECTION_TYPE
Direction);
```
This answers the query "Can this Line accept a call in this direction?". The answer will be 'no' if the Line is not activated; is already in use; has calls barred in the given direction; or has been earmarked by the Airspan operator.

Although a particular embodiment has been described herein, it will be appreciated that the invention is not limited thereto and that many modifications and additions thereto may be made within the scope of the invention.

What is claimed is:

1. A central terminal for routing calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the central terminal comprising:

a storage unit arranged to stare a phone number list associating phone numbers for said subscriber telecommunications equipment with corresponding of said lines to subscriber telecommunications equipment, the storage unit arranged to store a channel map, the channel map maintaining a mapping between said lines to subscriber telecommunications equipment and said telephone exchange.

2. A central terminal for routing calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the central terminal comprising:

a storage unit arranged to store a phone number list associating phone numbers for said subscriber telecommunications equipment with corresponding of said lines to subscriber telecommunications equipment;

a call manager for receiving a call from a subscriber terminal connected to the central terminal;

comparison logic for comparing a destination phone number contained within the call with the phone numbers maintained in the phone number list; and routing means, responsive to a match by the comparison logic, to route the call directly to the subscriber terminal to which the telecommunications equipment corresponding to the destination phone number is connected.

3. A central terminal as claimed in claim 1, further comprising:

a call manager for receiving a call from the telephone exchange or from subscriber terminals, and for generating a call instance to represent said call, the call instance having a plurality of attribute fields to store attributes defining the call, one such attribute being a phone number provided by the call;

the phone list being accessible by the call instance to enable other attributes of the call to be determined from said phone number provided by the call.

4. A central terminal as claimed in claim 3, further comprising a call list record accessible by the call manager, for containing a pointer to each call instance created by the call manager.

5. A central terminal as claimed in claim 1, wherein within said phone number list, a single phone number may be associated with one or more of said lines.

6. A central terminal as claimed in claim 1, wherein within said phone number list, one of said lines may be associated with one or more phone numbers.

7. A central terminal as claimed in claim 1, wherein the storage unit is further arranged to store a line list data element arranged to include a list of pointers to particular line data elements, each line data element identifying a line to subscriber telecommunications equipment.

8. A central terminal as claimed in claim 7, wherein the phone number list includes, for each phone number in the list, a pointer to the line list data element that includes pointers to said line data elements that identify suitable lines to be used to direct a call to the subscriber telecommunications equipment having that phone number.

9. A central terminal as claimed in claim 1, wherein the phone number list is represented by an object oriented programming (OOP) object.

10. A call routing element for a central terminal to arrange the central terminal to route calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the call routing element comprising:

a phone number list associating phone numbers for said subscriber telecommunications equipment with corresponding of said lines to subscriber telecommunications equipment;

a channel map maintaining a mapping between said lines to subscriber telecommunications equipment and said telephone exchange.

11. A call routing element for a central terminal to arrange the central terminal to route calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the call routing element comprising:

a phone number list associating phone numbers for said subscriber telecommunications equipment with corresponding of said lines to subscriber telecommunications equipment;

a call manager for receiving a call from a subscriber terminal connected to the central terminal;

comparison logic for comparing a destination phone number contained within the call with the phone numbers maintained in the phone number list; and routing means, responsive to a match by the comparison logic, to route the call directly to the subscriber terminal to which the telecommunications equipment corresponding to the destination phone number is connected.

12. A method of operating a central terminal to route calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the method comprising the step of:

storing a phone number list associating phone numbers for said subscriber telecommunications equipment with corresponding of said lines to subscriber telecommunications equipment;

storing a channel map, the channel map maintaining a mapping between said lines to subscriber telecommunications equipment and said telephone exchange.

13. A method of operating a central terminal to route calls between a telephone exchange connectable to the central terminal and a plurality of subscriber terminals, the central terminal being arranged to communicate with the subscriber terminals via wireless links, and each subscriber terminal being arranged to support one or more lines to subscriber telecommunications equipment, the method comprising the step of:

storing a phone number list associating phone numbers for said subscriber telecommunications equipment with corresponding of said lines to subscriber telecommunications equipment;

receiving a call from a subscriber terminal connected to the central terminal;

comparing a destination phone number contained within the call with the phone numbers maintained in the phone number list; and responsive to a match by the comparison logic, routing the call directly to the subscriber terminal to which the telecommunications equipment corresponding to the destination phone number is connected.

14. A method as claimed in claim 12, further comprising the steps of:

responsive to receiving a call from the telephone exchange or from a subscriber terminals, generating a call instance to represent said call, the call instance having a plurality of attribute fields to store attributes defining the call, one such attribute being a phone number provided by the call; and accessing the phone list to enable other attributes of the call to be determined from said phone number provided by the call.

* * * * *